(12) United States Patent
Boroushaki et al.

(10) Patent No.: US 12,162,169 B2
(45) Date of Patent: Dec. 10, 2024

(54) SYSTEM AND METHOD FOR LOCATION DETERMINATION AND ROBOT CONTROL

(71) Applicant: Massachusetts Institute of Technology, Cambridge, MA (US)

(72) Inventors: Tara Boroushaki, Cambridge, MA (US); Fadel Adib, Cambridge, MA (US); Junshan Leng, Malden, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 273 days.

(21) Appl. No.: 17/530,603

(22) Filed: Nov. 19, 2021

(65) Prior Publication Data

US 2022/0168899 A1  Jun. 2, 2022

Related U.S. Application Data

(60) Provisional application No. 63/119,544, filed on Nov. 30, 2020.

(51) Int. Cl.
*B25J 9/16* (2006.01)
*G05B 19/4155* (2006.01)
(Continued)

(52) U.S. Cl.
CPC ........ *B25J 9/1697* (2013.01); *G05B 19/4155* (2013.01); *G06K 7/10366* (2013.01); *G06K 19/0723* (2013.01); *G05B 2219/40269* (2013.01)

(58) Field of Classification Search
None
See application file for complete search history.

(56) References Cited

U.S. PATENT DOCUMENTS 11,420,652 B2 * 8/2022 Connell ................ H04W 4/029
2018/0107969 A1    4/2018 Trivelpiece
(Continued)

FOREIGN PATENT DOCUMENTS

CA    3131314 A1 * 10/2020 .......... A61G 3/0808
JP    6807949 B2 *  1/2021 ............. B25J 13/00

OTHER PUBLICATIONS

"Song, Kai-Tai; Chang, Yu-Hsien; Chen, Jen-Hao; 3D Vision for Object Grasp and Obstacle Avoidance of a Collaborative Robot, 2019, IEEE/ASME, p. 254-258" (Year: 2019).*

(Continued)

*Primary Examiner* — Jaime Figueroa
*Assistant Examiner* — Atticus A Cameron
(74) *Attorney, Agent, or Firm* — DALY, CROWLEY, MOFFORD & DURKEE LLP

(57) ABSTRACT

A control system and method locates a partially or fully occluded target object in an area of interest. The location of the occluded object may be determined using visual information from a vision sensor and RF-based location information. Determining the location of the target object in this manner may effectively allow the control system to "see through" obstructions that are occluding the object. Model-based and/or deep-learning techniques may then be employed to move a robot into range relative to the target object to perform a predetermined (e.g., grasping) operation. This operation may be performed while the object is still in the occluded state or after a decluttering operation has been performed to remove one or more obstructions that are occluding light-of-sight vision to the object.

23 Claims, 9 Drawing Sheets

(51) Int. Cl.
G06K 7/10 (2006.01)
G06K 19/07 (2006.01)

(56) References Cited

U.S. PATENT DOCUMENTS

2020/0242315 A1  7/2020 George
2021/0232154 A1  7/2021 Kewitsch

OTHER PUBLICATIONS

"Ratliff, Nathan; Zucker, Matt; Bagnell, Andrew; Srinivasa, Siddhartha; CHOMP: Gradient Optimization Techniques for Efficient Motion Planning, 2009, IEEE, p. 489-494" (Year: 2009).*
"Travis Deyle, Hai Nguyen, Matt Reynolds, Charles Kemp, 'RF Vision: RFID Receive Signal Strength Indicator (RSSI) Images for Sensor Fusion and Mobile Manipulation', Oct. 11, 2009, IEEE/RSJ, p. 5553-5560" (Year: 2009).*
"MyungSik Kim, Hyung Wook Kim, and Nak Young Chong, 'Automated RObot Docking Using Direction Sensing RFID', Apr. 10, 2007, IEEE, p. 4588-4593" (Year: 2007).*
"Zhongqin Wang, Min Xu, Ning Ye, Ruchuan Wang, Haiping Huang, 'RF-MVO: Simultaneous 3D Object Localization and Camera Trajectory Recovery Using RFID Devices and a 2D Monocular Camera', 2018, IEEE, p. 534-544" (Year: 2018).*
Chen et al.; "Towards robotic picking of targets with background distractors using deep reinforcement learning"; Proceedings of the 2nd WRC Symposium on Advanced Robotics and Automation (WRC SARA); IEEE, Aug. 2019; 6 Pages.
Kim et al.; "Planning for a grasp selection of partially occluded objects"; 2016 IEEE International Conference on Robotics and Automation (ICRA); IEEE, May 2016; 8 Pages.
Adib et al.; "Capturing the Human Figure Through a Wall"; ACM Transactions on Graphics, vol. 34, No. 6, Article 219; Published Nov. 2015; 13 Pages.
"Alien"; Downloaded Mar. 30, 2022; https://alientechnology.com; 2 Pages.
Aydemir et al.; "Search in the real world: Active visual object search based on spatial relations"; 2011 IEEE International Conference on Robotics and Automation; IEEE, 2011; 7 Pages.
Bajcsy et al.; "Active Perception"; Proceedings of the IEEE; vol. 76, No. 8; IEEE, 1988; 34 Pages.
Bohg et al.; "Interactive Perception: Leveraging Action in Perception and Perception in Action"; IEEE Transaction on Robotics; vol. 33, No. 6; IEEE Xplore Digital Library; DOI 10.1109/TRO.2017.2721939; IEEE, 2017; 18 Pages.
"Coppelia"; Downloaded Mar. 30, 2022; http://www.coppeliarobotics.com; 3 Pages.
Cui et al.; "Probabilistic Active Filtering with Gaussian Processes for Occluded Object Search in Clutter"; Applied Intelligence; vol. 50, No. 12; 2020; 25 Pages.
Danielczuk et al.; "Mechanical Search: Multi-Step Retrieval of a Target Object Occluded by Clutter"; 2019 International Conference on Robotics and Automation (IRCA); IEEE, 2019; 9 Pages.
Danielczuk et al.; "X-Ray: Mechanical Search for an Occluded Object by Minimizing Support of Learned Occupancy Distributions"; 2020 IEEE/RSJ International Conference on Intelligent Robots and Systems (IROS); IEEE, 2020; 8 Pages.
Das et al.; "RFID Forecasts, Players and Opportunities: 2009-2019"; IDTechEx Report; Securing Pharma; Published in Apr. 2009; 17 Pages.
Deyle et al.; "A foveated passive UFH RFID system for mobile manipulation"; 2008 IEEE/RSJ International Conference on Intelligent Robots and Systems; IEEE, 2008; 6 Pages.
Deyle et al.; "Finding and Navigating to Household Objects with UHF RFID Tags by Optimizing RF Signal Strength"; 2014 IEEE/RSJ International Conference of Intelligent Robots and Systems; IEEE, 2014; 8 Pages.
Deyle et al.; "In-Hand Radio Frequency Identification (RFID) for Robotic Manipulation"; 2013 IEEE International Conference on Robotics and Automation; IEEE, 2013; 8 Pages.
Deyle et al.; "RF Vision: RFID Receive Signal Strength Indicator (RSSI) Images for Sensor Fusion and Mobile Manipulation"; 2009 IEEE/RSJ International Conference on Intelligent Robots and Systems; IEEE, 2009; 8 Pages.
Dogar et al.; "Physics-Based Grasp Planning Through Clutter"; 2012; 8 Pages.
"Embotech"; Downloaded Mar. 30, 2022; https://www.embotech.com; 9 Pages.
"Gazebo"; Downloaded Mar. 30, 2022; http://gazeboism.org; 7 Pages.
Gueaieb et al.; "An Intelligent Mobile Robot Navigation Technique Using RFID Technology"; IEEE Transactions on Instrumentation and Measurement; vol. 57, No. 9; DOI: 10.1109/TIM.2008.919902; Sep. 2008; 11 Pages.
Huang et al.; "Occlusion-Aware Reconstruction and Manipulation of 3D Articulated Objects"; 2012 IEEE International Conference on Robotics and Automation; IEEE, 2012; 7 Pages.
Jang et al.; "End-to-End Learning of Semantic Grasping"; arXiv preprint arXiv:1707.01932; 2017; 14 Pages.
Kahn et al.; "Active Exploration Using Trajectory Optimization for Robotic Grasping in the Presence of Occlusions"; 2015 IEEE International Conference on Robotics and Automation (ICRA); IEEE, 2015; 8 Pages.
Katz et al.; "Perceiving, Learning, and Exploiting Object Affordances for Autonomous Pile Manipulation"; Autonomous Robots; vol. 37, No. 4; 2014; 8 Pages.
Kim et al.; "Direction Sensing RFID Reader for Mobile Robot Navigation"; IEEE Transactions on Automation Science and Engineering; vol. 6, No. 1; DOI: 10.1109/TASE.2008.2006858; Jan. 2009; 12 Pages.
Kim et al.; "Planning for Grasp Selection of Partially Occluded Objects"; 2016 IEEE International Conference on Robotics and Automation (ICRA); IEEE, 2016; 8 Pages.
Knepper et al.; "IkeaBot: An Autonomous Multi-Robot Coordinated Furniture Assembly System"; 2013 IEEE International Conference on Robotics and Automation (ICRA); May 2013; 9 Pages.
Luo et al.; "3D Backscatter Localization for Fine-Grained Robotics"; 16th USENIX Symposium on Networked Systems Designs and Implementation; 2019; 18 Pages.
Ma et al.; "Minding the Billions: Ultra-wideband Localization for Deployed RF Tags"; Proceedings of the 23rd Annual International Conference on Mobile Computing and Networking; Oct. 2017; https://doi.org/10.1145/3117811.3117833; 14 Pages.
Morrison et al.; "Multi-View Picking: Next-best-view Reaching for Improved Grasping in Clutter"; 2019 International Conference for Robotics and Automation (ICRA); IEEE, 2019; 7 Pages.
MoveIt; "Moving Robots into the Future"; https://moveit.ros.org; Downloaded on Mar. 30, 2022; 6 Pages.
Nam et al.; "Planning for target retrieval using a robotic manipulator in cluttered and occluded environments"; arXiv:1907.03956[cs.RO]; https://doi.org/10.48550/arXiv.1907.03956; Submitted Jul. 9, 2019; 8 Pages.
Novkovic et al.; "Object Finding in Cluttered Scenes Using Interactive Perception"; 2020 IEEE International Conference for Robotics and Automation (ICRA); IEEE, 2020; 7 Pages.
Park et al.; "Autonomous Mobile Robot Navigation Using Passive RFID in Indoor Environment"; 2009 IEEE Transactions on Industrial Electronics; vol. 56, No. 7; Jul. 2009; 8 Pages.
"Point Cloud Library (PCL)"; Downloaded Mar. 30, 2022; http://pointclouds.org; 3 Pages.
Price et al.; "Inferring Occluded Geometry Improves Performance when Retrieving an Object from Dense Clutter"; arXiv preprint arXiv:1907.08770; 2019; 16 Pages.
"Rviz"; Downloaded Mar. 30, 2022; http://wiki.ros.org/rviz; 4 Pages.
Schaul et al.; "Prioritized Experience Replay"; arXiv:1511.05952[cs.LG]; https://doi.org/10.48550/arXiv.1511.05952; Submitted Nov. 18, 2015; 21 Pages.
Shangguan et al.; "The Design and Implementation of a Mobile RFID Tag Sorting Robot"; Proceedings of the 14th annual interna-

(56) References Cited

OTHER PUBLICATIONS tional conference on mobile systems, applications, and services; DOI: http://dx.doi.org/10.1145/2906388.2906417; Jun. 2016; 12 Pages.
Sucan et al.,; "The Open Motion Planning Library"; IEEE Robotics & Automation Magazine; vol. 19, No. 4; Dec. 6, 2012; 11 Pages.
Wada et al.; "Joint Learning of Instance and Semantic Segmentation for Robotic Pick-and-Place with Heavy Occlusions in Clutter"; 2019 International Conference on Robotics and Automation (ICRA); IEEE, 2019; arxiv:2001.07481v1 [cs.RO]; 7 Pages.
Wang et al.; "Dude, Where's My Card? RFID Positioning That Works With Multipath and Non-Line of Sight"; Proceedings of the ACM SIGCOMM 2013 Conference on SIGCOMM; 2013; 12 Pages.
Wang et al.; "RF-Compass: Robot Object Manipulation Using RFIDs"; Proceedings of the 19th annual international conference on Mobile computing & networking (MobiCom '13); 2013; 13 Pages.
Yak, "A library for integrating depth images into Truncated Signed Distance Fields"; Downloaded Mar. 30, 2022; https://github.com/ros-industrial/yak_ros; 7 Pages.
Yang et al.; "A Deep Learning Approach to Grasping the Invisible"; IEEE Robotics and Automation Letters; Preprint Version; Accepted Jan. 2020; 11 Pages.
Zeng et al. "Robotic pick-and-place of novel objects in clutter with multi-affordance grasping and cross-domain image matching"; The International Journal of Robotics Research; DOI: 10.1177/0278364919868017; 2019; 16 Pages.
Zeng et al.; "Learning Synergies between Pushing and Grasping with Self-supervised Deep Reinforcement Learning"; 2018 IEEE/RSJ International Conference on Intelligent Robots and Systems (IROS); IEEE, 2018; 9 Pages.
Ashok; "Demo: BiFocus—Using Radio-Optical Beacons for an Augmented Reality Search Application"; Proceeding of the 11th Annual International Conference on Mobile Systems, Applications, and Services; Jun. 25, 2013; 1 Page.
Boroushaki et al.; "Robotic Grasping of Fully-Occluded Objects using RF Perception"; 2021 IEEE International Conference on Robotics and Automation (ICRA); IEEE; May 30, 2021; 7 Pages.
Dastin; "Exclusive: Amazon Rolls Out Machines that Pack Orders and Replace Jobs"; Reuters, Thomson Reuters 13; May 2019; 4 Pages.
Deyle et al.; "In-Hand Radio Frequency identification (RFID) for Robotic Manipulation"; 2013 IEEE International Conference on Robotics and Automation; IEEE; May 6, 2013; 8 Pages.
Du et al.; "Vision-based Robotic Grasping From Object Localization, Object Pose Estimation to Grasp Estimation for Parallel Grippers: A Review"; Artificial Intelligence Review 54.3 (2021); Mar. 2021; 39 Pages.
Gareis et al.; "A MIMO UHF-RFID SAR 3D Locating System for Autonomous Inventory Robots"; 2020 IEEE MTT-S International Conference on Microwaves for Intelligent Mobility (ICMIM); IEEE, 2020; 4 Pages.
Goller et al.,; "Fusing RFID and Computer Vision for Probabilistic Tag Localization"; 2014 IEEE International Conference on RFID (IEEE RFID); Apr. 8, 2014; 8 Pages.
Inagaki; "Packing T-Shirts? There's a Uniqlo Robot for that"; The Financial Times Limited; 2022; 4 Pages.
Kamol et al.; "RFID Based Object Localization System using Ceiling Cameras with Particle Filter"; Future Generation Communication and Networking (fgcn 2007); vol. 2; IEEE; Dec. 6, 2007; 8 Pages.
Kober et al.: "Reinforcement Learning in Robotics: A Survey"; The International Journal of Robotics Research 32.11; Sep. 2013; 73 Pages.
Li et al.; "ID-Match: A Hybrid Computer Vision and RFID System for Recognizing Individuals in Groups"; Robot Personalities; Proceedings of the 2016 CHI Conference on Human Factors in Computing Systems; #chi4good, CHI 2016; 12 Pages.
Li et al.; "Making the Invisible Visible: Action Recognition Through Walls and Occlusions"; Proceedings of the IEEE/CVF International Conference on Computer Vision; 2019; 10 Pages.
Liu et al.; "Robust Linear Regression via lo Regularization"; IEEE Transactions on Signal Processing; vol. 66, No. 3; Feb. 1, 2018; 16 Pages.
Lu et al.; "milliEgo: Single-chip mm Wave Radar Aided Egomotion Estimation via Deep Senor Fusion"; Proceedings of the 18th Conference on Embedded Networked Sensor Systems; Nov. 16, 2020; 14 Pages.
Luo et al.; "3D Backscatter Localization for Fine-Grained Robots"; Proceedings of the 16th USENIX Symposium on Networked Systems Design and Implementation (NSDI'19); Feb. 26-28, 2019; 18 Pages.
Market Study Report, LLC; "Global Material Handling Robots Market Size to surpass USD 13.8 Billion in value in 2006"; Market Study Report; Mar. 30, 2020; 5 Pages.
Morrison et al.; "Closing the Loop for Robotic Grasping: A Realtime, Generative Grasp Synthesis Approach"; Apr. 14, 2018; arXiv preprint arXiv:1804.05172 (2018); 10 Pages.
Motroni et al.; "A Multi-Antenna SAR-based method for UHF RFID Tag Localization via UGV"; 2018 IEEE International Conference on RFID Technology & Application (RFIS-TA); IEEE, 2018; 6 Pages.
Paszke et al.; "PyTorch: An Imperative Style, High-Performance Deep Learning Library"; Advances in neural information processing systems 32; 2019; 12 Pages.
Robotiqs; http://robotiq.com/products/2f85-140-adaptive-robot-gripper; 14 Pages.
Wang et al.; RF-Focus: Computer Vision-assisted Region-of-interest RFID Tag Recognition and Localization in Multipath-prevalent Environments; Proc. AMC Interact. Mob. Wearable Ubiquitous Techno.; vol. 3, No. 1, Article 29; Publication date Mar. 2019; 30 Pages.
Xie et al.; "Tell Me What I See: Recognize RFID Tagged Objects in Augmented Reality Systems"; Proceedings of the 2016 ACM International Joint Conference on Pervasive and Ubiquitous Computing; Sep. 12, 2016; 12 Pages.
Xu et al.; "iVR: Integrated Vision and Radio Localization with Zero Human Effort"; Proc. ACM Interact. Mob. Wearable Ubiquitous Technol., vol. 3, No. 3, Article 114; Sep. 2019; 22 Pages.
Yang et al.; "A Deep Learning Approach to Grasping the Invisible"; IEEE Robotics And Automation Letters; Preprint Version; Accepted Jan. 14, 2020; 11 Pages.
Yang et al.; "Analysis of Kalman Filter-Based Localization for HIMR RFID Systems"; IEEE Journal of Radio Frequency Identification; vol. 3, No. 3; Sep. 2019; 9 Pages.
Zeng et al.; "Multi-view Self-supervised Deep Learning for 6D Pose Estimation in the Amazon Picking Challenge"; 2017 IEEE International Conference on Robotics and Automation (ICRA); IEEE; May 29, 2017; 8 Pages.
U.S. Non-Final Office Action dated Jul. 18, 2024 for U.S. Appl. No. 17/819,685; 19 Pages.

* cited by examiner

SYSTEM AND METHOD FOR LOCATION DETERMINATION AND ROBOT CONTROL

CROSS-REFERENCE TO RELATED APPLICATIONS

This application claims benefit to U.S. Provisional Patent Application No. 63/119,544, filed on Nov. 30, 2020, the contents of which is incorporated by reference herein in its entirety.

FIELD

One or more embodiments described herein relate to systems and methods for performing location determination and/or robot control.

BACKGROUND

Robotic and other types of mechanical systems are used in many commercial, industrial and scientific applications. Examples include product manufacturing, surgical procedures, warehouse management, sample gathering and space exploration, just to name a few.

To carry out their intended tasks, many of these systems are equipped with one or more image sensors, i.e., cameras. The sensors may be helpful in locating target objects, especially in what are considered to be unstructured environments. For example, a warehouse robot having an image sensor may be given the task to retrieve a desired object from under a pile. Because the object is under the pile, its location may not be apparent from the imagery generated by the vision sensors. Such an object may therefore be considered to be partially for fully occluded from view. As a result, the robot will be unable to retrieve the object, thus necessitating intervention of a human worker to resolve the problem. This introduces inefficiencies and increases costs.

Without direct line-of-sight (i.e. in partially or fully occluded environments), existing systems are unable to retrieve target objects. Moreover, existing systems are typically limited for use in a single pile or pick-up bin, not for locating and/or retrieving objects in multiple piles or objects which are occluded from view by multiple obstacles disposed over them.

SUMMARY OF THE INVENTION

One or more embodiments described herein provide system and method for locating a target object while that object is in a partially or fully visually occluded state in an area of interest.

These or other embodiments provide a system and method for controlling a robot (or other mechanical system) to perform one or more intended operations relative to the target object, after the target object has been located and while the object is still in the occluded state.

These or other embodiments provide a control system which includes a storage area configured to store instructions and a controller configured execute the instructions to: a) determine a location of a tagged target object in an area of interest based on a radio frequency (RF) signal, b) determine a trajectory to grasp the target object based on a combination of the RF frequency signal and visual information from a vision sensor, c) generate a control signal to perform a robot grasping operation, and d) determine whether the target object has been grasped by the robot grasping operation.

In accordance with one or more other embodiments, a control system includes a modeler configured to generate a representation of an area of interest (AOI) based on data from a vision sensor, the area of interest including a target object including or proximate to a radio frequency identification (RFID) tag; an extractor configured to extract one or more occluded regions from the AOI representation, the one or more occluded regions including an obstruction that is occluding the target object; and a trajectory calculator configured to generate a first trajectory of a robot to perform a grasping operation of the target object, the first trajectory generated based on location information and the vision sensor data, the location information corresponding to a location in the area of interest based on a signal from the RFID tag.

In accordance with one or more other embodiments, a reinforcement learning method includes learning, using a neural network, one or more policies to control a robot to grasp a RF-tagged object, the object located in an environment which includes other objects, the learning including fusing vision information and an RF perception of the RF-tagged object, wherein: the network includes a deep convolutional neural network, and fusing the vision information and the RF perception is performed based on an RF-determined location of the object used as an attention mechanism and an RF kernel, and by applying a binary mask around the location of the object in a camera image corresponding to the vision information.

In accordance with one or more other embodiments, a control system includes a storage area configured to store instructions and a controller configured execute the instructions to: a) determine a location of a tagged target object in an area of interest based on a radio frequency (RF) signal, b) determine a trajectory to grasp the target object based on a combination of the RF frequency signal and visual information from a vision sensor; and c) generate a control signal to perform a robot grasping operation which includes decluttering the environment or picking up the target object along a line-of-sight relative to a robot in a state where the target object is not partially or fully occluded.

In accordance with a further aspect of the concepts describes herein, a reinforcement learning method comprises learning, using a neural network, one or more policies to control a robot to grasp a RF-tagged object, the RF-tagged object located in an environment which includes other objects, the learning including fusing vision information and an RF signal of the RF-tagged object, wherein fusing the vision information and the RF signal is performed based on RF-determined location information.

In embodiments, the neural network includes a deep convolutional neural network.

In embodiments, the fusing is performed by using the RF-tagged object as an attention mechanism and an RF kernel.

In embodiments, the RF location information is used to apply a binary mask around a location of the RF-tagged object in a camera image corresponding to the vision information.

In embodiments learning the one or more policies includes implementing a spatio-temporal reward function. In embodiments, the reward function is implemented as an inverse of a distance from a location of the RF-tagged object, the reward maximized for earlier success corresponding to a temporal part of the spatio-temporal reward function.

In embodiments, the one or more policies correspond to directly grasping the RF-tagged object.

In embodiments the one or more policies include: performing decluttering prior to controlling the robot to grasp the RF-tagged object.

In embodiments, the decluttering includes extracting one or more occluded objects from a pile.

In embodiments the decluttering includes moving one or more occluded objects or moving one or more distractor items to a side location.

In accordance with a further aspect of the concepts describes herein, a control system, comprises a storage area configured to store instructions; and a controller configured execute the instructions to: a) determine a location of a tagged target object in an area of interest based on a radio frequency (RF) signal, b) determine a trajectory to grasp the tagged target object based on a combination of the RF frequency signal and visual information from a vision sensor; and c) generate a control signal to perform a robot grasping operation which includes picking up the tagged target object along a line-of-sight relative to a robot in a state where the tagged target object is not partially or fully occluded.

DETAILED DESCRIPTION

Embodiments described herein are directed toward a control system and method which locate a partially or fully occluded target object in an area of interest. The location of the occluded object may be determined using a combination of visual information from an image sensor and RF-based location information. Determining the location of the target object in this manner may effectively allow the control system to "see through" obstructions that are blocking the object from view (i.e., are occluding the object). Model-based and/or deep-learning techniques may then be employed to move a robot into range relative to the target object to perform a predetermined operation (e.g., a mechanical operation such as grasping). This operation may be performed while the object is still in the occluded state or after a decluttering operation has been performed to remove one or more obstructions that are occluding line-of-sight vision to the object.

Figure 1:
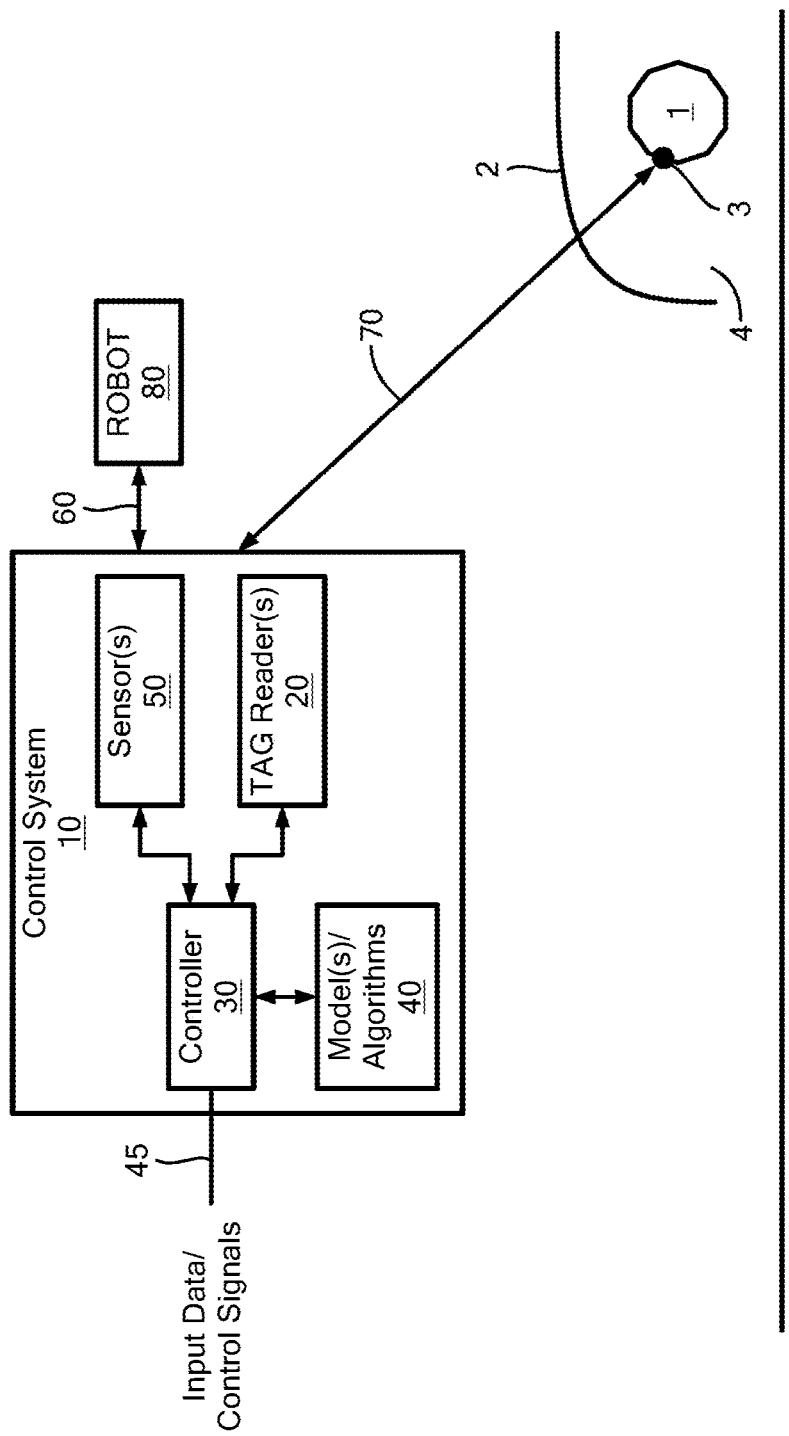
FIG. 1 is a block diagram of an example embodiment of a control system coupled to a robot.

FIG. 1 is a diagram which illustrates an example control system 10 for locating a target object 1 while the object is in a partially or fully visually occluded state in an area of interest 4. The target object may be any object within the scope of the intended application of the system. One example is a package at a shipping facility. Another example is an inventory item in a warehouse. In other cases, the target object may be another type of item depending on the application.

The area of interest 4 may be a structured environment where, for example, various objects are (or should) be placed at certain predetermined locations, or an unstructured environment where objects are at random or other locations not previously known by the system. In one embodiment, the area of interest may include both types of environments which may or may not be cluttered, e.g., one which includes one or more obstructions that impede movement of a robot or other mechanical system and thus which makes the operation (e.g., grasping, retrieving, sorting, decluttering, or another intended function) to be performed by the robot or mechanical system impossible or difficult.

In the example of FIG. 1, the target object 1 is occluded by a structure 2. That is, structure 2 obstructs a view of some or all of object 1 and thus is structure 2 is sometimes referred to herein as an obstruction). The obstruction may or may not be one or more objects having the same or a similar appearance to the target object (i.e., structure 2 may be one or more objects having a physically similar appearance to the target object).

In one example embodiment, the area of interest 4 may include a group (or "pile") of objects which may be the same as or similar to the target object (that is, the target object may be one of a plurality of physically similar objects disposed in a group or pile). In other example embodiments, the obstruction may be an item different (e.g. physically different or a different type of item) from the target object. For example, if the target item has a spherical shape (e.g. a ball shape), the obstruction may be flat walls of a container in which the sphere is located (e.g. the obstruction may be one or more of: a container, structural support, frame, packaging in which the target object is located, a covering or housing, or any other hard of soft physical material that may occlude perception of the target object, for example, by an image sensor but through which radio frequency (RF) signals may pass. In still other example embodiments, the obstruction may be a combination of one or more items which are the same as or similar to the target object and one or more items which are different from the target object. The obstruction(s) may therefore be said to make line-of-sight perception of the target object not possible (or at least not fully possible in that only a portion of the object is visible). For convenience of description, the target object may sometimes also be referred to herein as an "occluded object" with the understanding that the occlusion may be partially or fully imperceptible from a line-of-sight perspective, at least with respect to vision sensors.

The control system 10 includes one or more tag readers 20 (or more simply "readers"), a controller 30, and at least one storage system 40 (e.g., a memory or other storage device). The tag reader(s) may receive signals from one or more tags 3 coupled to the occluded target object 1 (e.g. attached, disposed on or otherwise directly or indirectly coupled to or otherwise associated with or in the area of the occluded target object 1).

In embodiments, one or more tags may be provided as radio frequency identification (RFID) tags in which case one or more tag readers 20 may be provided as radio frequency identification (RFID) tag readers 20. For illustrative purposes, one RFID tag 3 is shown coupled or otherwise attached to the target object 1, but in embodiments, more than one RFID tag may be attached or otherwise coupled to the target object.

It should be understood that in embodiments, the tags may be different from RFID tags. For example, the target object may emit or otherwise produce Bluetooth signals, WiFi signals or other types of signals (that is, target objects may be said to be Bluetooth-tagged, WiFi-tagged, or tagged using another form of communication signal or standard or another form of wireless technology). To promote clarity in the description of the concepts sought to be protected by this patent, a tag may sometimes be referred to herein as an RFID tag. It should, however, be understood that the term "RF-tagged target object" (or more simply "tagged target object") may include all forms of tags and communication signals and communication standards and technologies, not just RFID per se.

When a declutter operation is performed, then a vision sensor may be able to distinguish (e.g., by silhouette or other feature recognition) between the untagged target object and the tagged object for purposes of accessing the target object. In one embodiment, the tag may be attached to an outside surface of the object. In another embodiment, the tag may be included in (i.e. beneath a surface of) or with the object, for example, by or as received by the manufacturer or other object provider.

When multiple RFID tags are in the area of interest 4 (e.g., on the same target object or on different objects to be located), one RFID reader 20 may be used or multiple readers may be used to detect the signals provided from (e.g. transmitted or otherwise emitted or emanating from) the tag(s). In the case of multiple tag readers, each reader may be set to receive signals (e.g. RF signals) provided from each tag or tags. In embodiments, tags may be configured to transmit or otherwise provide signals (e.g., RFID signals) at one or more predetermined frequencies or in one or more frequency ranges. A wireless communications link 70 is shown as an direct line from tag 3. Each tag 3 may be an active tag powered by a battery or a passive tag which receives energy from the tag reader(s) transmissions to activate an internal circuit within the tag (e.g. the tag may act as a transponder). The transmission power of the RFID reader may determine the range of operation of the control system relative to receiving RF signals from the one or more tags. An example is 9 meters but the range may be different in another embodiment.

Once activated, the tag may emit an RF signal of a predetermined frequency (e.g., in a ultra-high frequency (UHF) band or another band) with or without an embedded identifier. The RF signal received from each tag may be uniquely identified based on its frequency and/or the embedded identifier.

In the example of FIG. 1, the target object 1 is fully occluded by obstruction 2. The obstruction may be any type of object which allows RF signals to pass. As previously described, the objection may be a soft obstruction or a hard objection. The obstruction may be another object which is the same as or similar to the target object, when, for example, the objects are in a pile or a collection or arrangement. In another case, the obstruction may be a cover or housing or packaging, a frame or container, or another type of material or structural feature. While the obstruction 2 fully occludes the target object from line-of-sight perception relative to the control system 10 in this example, in embodiments, the target object may only be partially occluded in that line-of-sight or from other angles of perception by the obstruction.

The controller 30 may be any type of processor, microprocessor, computer, or another type of processing logic device capable of performing the operations described herein. Irrespective of the type of processing logic device, controller 30 may execute instructions stored in storage 40 to perform the operations described herein. The instructions may be executed autonomously and/or based on data or control signals received from a central computer or other management system. The data and/or control signals may, for example, activate the control system to locate a particular target object (e.g., one having a specific tag frequency and/or identifier) or to search the area of interest 4 in general for any occluded objects to be identified. A robot operation may then be performed after target objection location is achieved.

The storage area 40 may be, for example, one or more memory chips, an interior memory, or a volatile or non-volatile memory or any other form of storage. The instructions may be firmware, application code, or another type of control software to be executed by the controller 30. As will be described in greater detail, the instructions may include ones that implement one or more models for locating the occluded target object and for then taking additional action, which, for example, may involve controlling movement of a robot 80 to grasp the target object and/or to perform other operations. The models may be machine-learning (or so-called deep-learning) models or other forms of artificial intelligence that may be used, among other operations, for location prediction, optimization, and verification.

In addition to the aforementioned features, the control system 10 may include one or more sensors 50. The sensors 50 may include at least one of: image sensor(s) such as a camera, proximity sensors to help guide movement of the robot, and/or sensors designed to detect clutter or other forms of debris or structure that may impede the progress, movement, or operation of the robot. When equipped with one or more vision sensors, the controller may locate and control the robot when line-of-sight perception is possible relative to a target of interest.

The robot 80 may be any type of robot or mechanical system intended to operate relative to the target object based on a location of the object determined by the control system. In one embodiment, the robot may be a mobile arm controlled to grasp or retrieve the target object from the area of interest. In one embodiment, the robot may also perform a declutter operation prior to the grasping operation. The declutter operation may involve grasping, moving to the side, or otherwise manipulating the obstruction so that the grasping operation of the target object may be performed with a greater probability of success.

When a robot arm is used, the robot arm may be mounted on a fixed or moveable base that can transport the arm to a location at which the robot arm is at or within a distance from which the robot arm may grasp or otherwise perform a function relative to the target object. Various types of robot arms may be used. For example, the robot arm may have one or more joints or pivot points to allow for improved grasping. In one embodiment, all or a portion of the control system 10 may be mounted on the robot or robot arm. In another embodiment, the control system 10 may be mounted at a location different from the robot location.

Additionally, in FIG. 1, the control system 10 shown coupled to the robot 80 through a wired or wireless link 60. In another embodiment, the control system may be mounted on the robot along with its attendant sensors 50. In such a case, the control system may transmit status, location, tracking, movement, and/or other information to a central location for monitoring and/or control.

In operation, the system of FIG. 1 may be used to locate an occluded target object and then control operation of the robot to access the occluded object based on the location. In such an application, location information determined by the system may be input into one or more additional stages of a more comprehensive (or host) system for performing robot control. The following embodiments correspond to an example application of such a comprehensive system, where the controller 30 executes instructions that perform the three operations implemented in the following three stages of the system: 1) Location Determination Stage, 2) Robot Trajectory Optimization Stage, and 3) Robot Grasping Control Stage.

Figure 2:
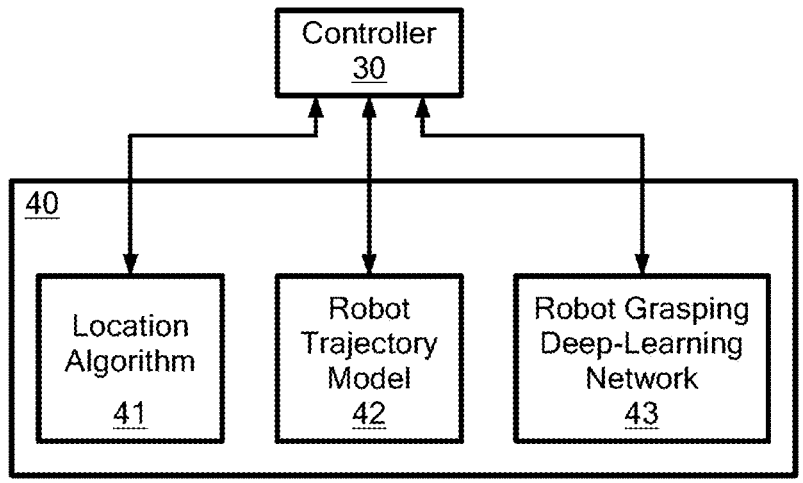
FIG. 2 is a block diagram of an example controller suitable for use in the control system of FIG. 1.

FIG. 2 is a diagram showing an embodiment of the controller 30 which may execute various types of instructions for performing operations of the three stages. For purposes of describing this embodiment, the RFID tag(s) may be UHF tags and the robot 80 may be mounted on a fixed base at a location that is kinematically able to reach the target object in the area of interest. In embodiments, movement of the arm of the robot may be achieved by a six degrees-of-freedom manipulator, which, for example, may start from a random initial location and orientation. The arm may be moved to grasp the target object, which in this example may be a package at a shipping facility but may be another other type of object given the intended application of the system.

Additionally, the sensors 50 of the robot may include a vision sensor in the form of an eye-in-hand camera, but different type of camera may be used in another embodiment. One or more of the RFID readers 20 may include a fixed-mount RF perception module which may serve as an RFID micro-location sensor having multiple antennas. The controller 30 may determine the RFID number of each of the target objects based on information output from RF perception module. Also, the area of interest 4 may be assumed to be a static area that is cluttered and includes one or more barriers or obstructions that occlude line-of-sight vision perception of the target object. The aforementioned structural features are merely examples and may be different in other embodiments.

Referring to FIG. 2, the instructions stored in a storage (e.g. storage 40 in FIG. 1) may implement a location algorithm 41 for performing operations of the Location Determination Stage, a model 42 for performing operations of the Robot Trajectory Optimization Stage, and instructions 43 for performing operations of the Robot Grasping Control Stage. As will be described in greater detail below, the instructions for the Robot Grasping Control Stage may corresponds to a model-free deep-learning network, but may correspond to a different type of instructions (model-based or model-free) in another embodiment. Examples of the models and algorithms are described below.

Location Determination Stage

Figure 3:
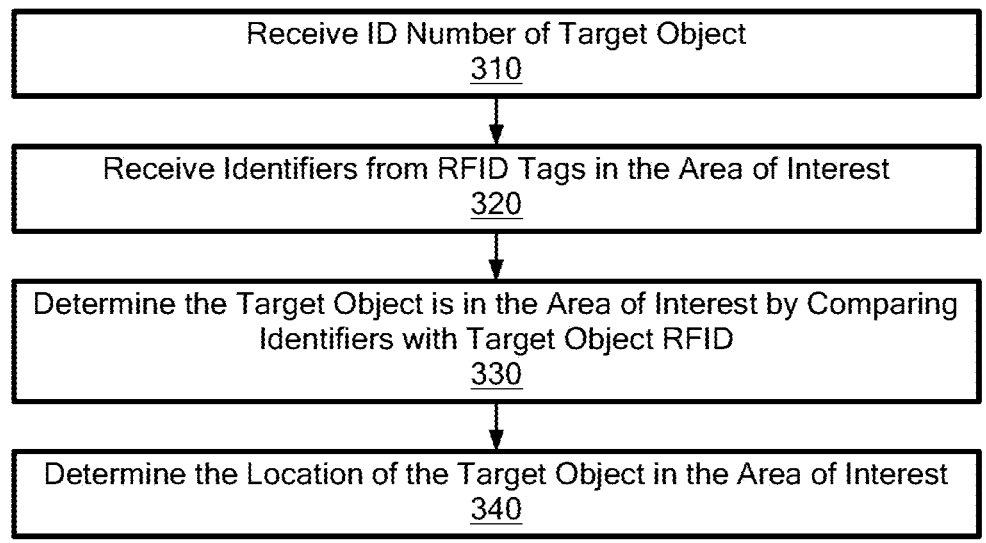
FIG. 3 is a flow diagram of an example method for locating a target object.

FIG. 3 is a flow diagram showing an embodiment of a method for determining the location of the target object in the area of interest, which method may correspond to location algorithm 41. The method includes, at 310, receiving an ID of a target object to be located (or in the target object vicinity). The RFID may be received as input data or control signals, for example, derived from a host system over a wired or wireless connection 45, as illustratively shown in FIG. 1. In this case, the RFID may be a serial number or other identifier and/or may be a particular frequency or another form of data or signal that can uniquely identify the target object or the vicinity in which it is located (generally, the RFID of the target object).

At 320, the controller 30 may generate one or more control signals to activate the RFID reader(s) 20 for the RF location perception. When activated, the RF reader(s) may receive RFID signal(s) from the tag(s) in the area of interest, or in one embodiment at least ones that are within a predetermined frequency band. Each of the RFID signals may include, for example, an identifier (e.g., a serial number) as previously described, and/or may be received on frequencies of respective ones of the tags. Once the RFID signal(s) is/are received, they may be input to the controller 30.

At 330, the received RFID signals are compared to the RFID of the target object received along connection 45 to determine whether there is a match. This operation may be performed by the controller 30. When there is a match, a confirmation signal may be generated to confirm the presence of the target object in the area of interest.

At 340, in response to the confirmation signal, the controller 30 may determine the location of the target object. In one embodiment, the location of the target object may be determined by mapping the position of the RFID signal relative to a predetermined reference point or frame of reference such as a coordinate system. In one embodiment, the RF-based location of the target object may be calculated as a three-dimensional (3D) location within a coordinate system having a predetermined origin (e.g., on the robot or at another location). The three-dimensional location may indicate the distance to and direction of the target object relative to the origin. The location (e.g., distance and direction) may be expressed radially or using a different method in other embodiments.

In one embodiment, the three-dimensional (3D) location of the target object may be determined based on the received RFID signal in the following manner. The controller 30 of the system applies a predetermined channel estimation technique to recover the channel(s) from the RFID response over a predetermined bandwidth. Then, the controller may estimate the Time-of-Flight of the signal from the tag to one or more of the RFID readers 20 using super resolution algorithms. From the Time-of-Flight information, the distance of the tag from each RFID reader is calculated using the speed of the radio signal, which is the speed of light. Based on this information, the controller may determine the tag location using a trilateration process. A different method may be used to determine the 3D location of the target object in another embodiment.

Once the controller 30 determines that the target object is, in fact, in the area of interest and then determines its location within that area, robot trajectory optimization may be performed.

Robot Trajectory Optimization Stage

The robot trajectory optimization stage may implement a method of controlling the orientation and/or movement (generally, movement) of the robot, so that it is in a position to operate on the target object (e.g. perform a robot operation including, but not limited to accessing, grasping or otherwise interacting with the target object). Ideally, the robot trajectory optimization stage implements such a method in manner which results in the most efficient robot-target object interaction possible. For example, ideally the robot physically moves along a direct a path as possible (given any obstruction) toward the target object (i.e., the robot physically efficiently moves toward the target object). When the robot has a direct line-of-sight to the target object and there is no clutter in the area, orientation and movement control may present less of a challenge because there are no obstacles or obstructions to manage. However, when there is no direct (or only a partial) line-of-sight to the target object because it is occluded and/or there is considerable clutter (especially in an unstructured environment), controlling the robot is a challenging task. The challenge of robot positioning is exacerbated when the area of interest is not known a priori. These problems are left unaddressed by existing vision-only systems, but are solved by one or more of the embodiments described herein.

In one embodiment, robot trajectory optimization may integrate RFID location information with visual information and then control movement of the robot, so that it can access the target object when that object is in an occluded state or after a declutter operation has been performed to improve access to the target object whether or not still in an occluded state.

In one embodiment, optimization may involve determining the best or most efficient path (at least one path) around one or more obstacles that may be impeding robot movement and/or that may be occluding the target object from the perspective of a vision sensor. Thus, trajectory optimization may allow for movement control that avoids obstacles and maneuvers the robot (e.g., robot arm) towards the target object in spite of clutter in the environment. Because movement of the robot may be controlled by servo motors in some cases, robot trajectory optimization may generally be referred to as an RF-Visual Servoing. However, movement may be accomplished in accordance with the embodiments described herein without using servo motors or different kinds of actuators.

In one example implementation (described in greater detail below), a UR5e robot may be controlled based on visual information from a camera sensor, along with a customized RF localization system operating with one or more software radios for receiving an RFID signal from a tag. The visual information may include a color image (e.g. an RGB image) and a depth image, e.g., the camera may output RGB-D data. An example of such a camera is an Intel RealSense D415 depth camera. In the case of a color image, reference is sometimes made herein to each pixel being represented by a predetermined number of bits (e.g. eight bits) which represent the color red (R bits), a predetermined number of bits (e.g. eight bits) which represent the color green (G bits) and a predetermined number of bits (e.g. eight bits) which represent the color blue (B-bits) using the so-called RGB color scheme in which a color and luminance value for each pixel can be computed from the RGB values. Thus, in an eight bit color RGB representation, a pixel may be represented by a twenty-four bit digital word.

It is of course possible to use greater or fewer than eight bits for each of the RGB values. It is also possible to represent color pixels using other color schemes such as a hue, saturation, brightness (HSB) scheme or a cyan, magenta, yellow, black (CMYK) scheme. It should thus be noted that the techniques described herein are applicable to a plurality of color schemes including but not limited to the above mentioned RGB, HSB, CMYK schemes as well as the Luminosity and color axes a & b (Lab), YUV color difference color coordinate system, the Karhunen-Loeve color coordinate system, the retinal cone color coordinate system and the X, Y, Z scheme. After reading the description provided herein, one of ordinary skill in the art will appreciate how to adapt the processing described herein to a selected color scheme.

Figure 4:
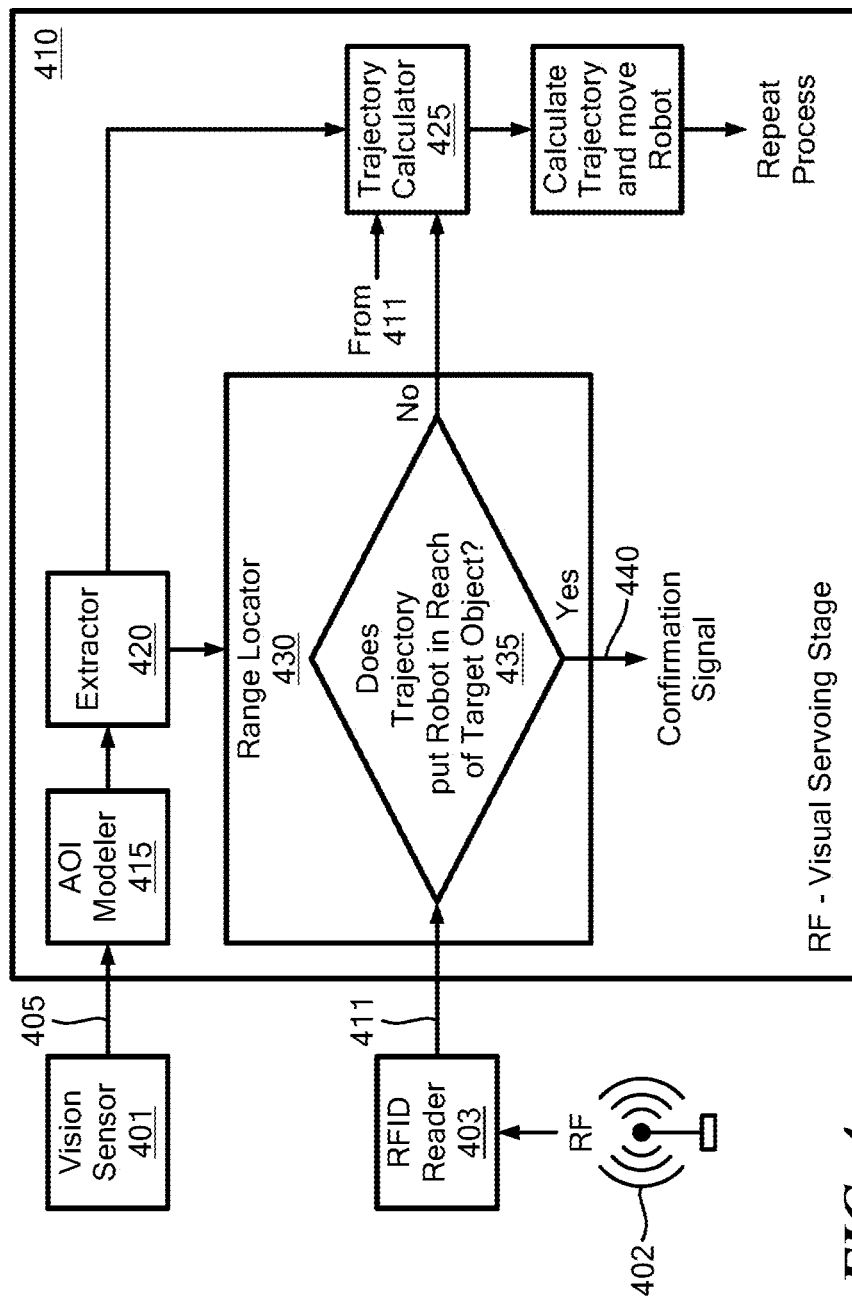
FIG. 4 is a block diagram of an RF-Visual Servoing Stage.

FIG. 4 is a diagram showing an embodiment of an RF-Visual Servoing stage 410, which may be implemented by the controller 30 using the robot trajectory optimization model 42. The stage includes a first input 405, a second input 411, an area of interest (AOI) modeler 415, an occlusion extractor 420, trajectory calculator 425, and a range locator 430.

The first input 405 is coupled to receive vision information from a vision sensor 401, which, for example, may be an RGB-D camera as previously described. The vision information may include video (e.g., still frame) of the area of interest where the target object is located, plus depth information that will allow for trajectory optimization as described below.

The second input 411 is coupled to receive the RFID location information of the target object, for example, as described with respect to operation 340 of FIG. 3. The RFID location information may be determined based on wireless signals transmitted from the tag on the target object and received by antenna 402 of the RFID reader 403.

The AOI modeler 415 generates a three-dimensional (3D) model of the area of interest that includes the target object. This and subsequent operations of the RF-Visual servoing stage may be performed by the occlusion extractor 420. According to this approach, the visual information output from the vision sensor is used by controller 30 to generate a 3D voxel grid map. The map may be stored, for example, in a Truncated Signed Distance Function (TSDF) volume.

In one embodiment, the controller 30 may generate the 3D voxel grid map as follows. Initially, it is noted that a voxel grid is a geometry type in 3D that may be defined on a regular 3D grid, and that a voxel may be thought of as the 3D counterpart to the pixel in 2D. a TSDF-based volumetric surface representation format represents a 3D environment as a voxel grid, in which each voxel stores also the signed distance to the nearest surface. In this case, the camera may be mounted at a predetermined location on the robot (e.g., what is effectively the wrist of the robot). The system may receive a depth image from the camera and the location of the robot (e.g., wrist) and then saves the visual information in a TSDF volume representation. A Yak package may be used, for example, for this part.

From the TSDF volume, the occlusion extractor 420 may extract the voxel that has not been visible to the camera because it is behind the obstruction. This extraction process may be performed in multiple stages. First, surfaces in the TSDF volume are extracted. These surfaces may be known to be the obstructions. Based on the current field of view of the camera and the obstruction(s), what part of the environment is hidden from the camera because of the obstruction(s) may be calculated. Each of the occlusions may then be modeled, for example, by a Gaussian 3D distribution. This operations may be performed, for example, using a PCL package.

In one embodiment, the extractor 420 determines (or extracts) frontiers and occluded region(s) based on the three-dimensional of the area of interest output from the modeler 415. This may involve video search logic which, for example, searches the modeled 3D information of the area of interest to locate objects or features that may correspond to occluded regions. The extractor may then extract location information corresponding to the features and identify them as occluded regions. The output of the extractor 420 may be input into both the trajectory calculator 425 and the range locator 430. In performing these operations, the extractor 420 may identify and then compensate for discontinuities in the RGB-D observation model output from the AOI modeler. The discontinuities may correspond, for example, to missing visual information that may not have been determined in accordance with the aforementioned method, for example, because of outliers.

The range locator 430 may execute an operation 435 that determines whether the robot is in a position and/or orientation that allows the robot to reach the target object (i.e., allows the robot to travel a distance to a location of the target object). If the robot is within reach as determined based on the RF-determined location of the target object (Yes, in operation 435), then a confirmation signal 440 may be generated and output to a subsequent stage of the system, e.g., the RF-Grasping Control Stage. If the robot is not within reach of the target object (No, in operation 435), then control may proceed to the trajectory calculator 425.

The trajectory calculator 425 receives the RFID location information from the RFID reader 403 and the one or more extracted occluded regions identified and isolated by the extractor. After it has been determined that the target object is occluded, one or more predetermined models may be used to determine whether there is a trajectory calculated by the trajectory calculator 425 that may be taken by the robot to access the target object. This may include a determination of which trajectory should be taken (if there is more than one trajectory possible). The trajectory calculator 425 may use, for example, Gaussian Belief Space Propagation for trajectory optimization. Once the trajectory has been calculated, the robot may be moved along that trajectory to a new position and/or orientation.

Once the robot has been moved to the new position and/or orientation, control proceeds back to receive new output from the RFID reader 403. This output is input into the range locator 430 and re-performs the aforementioned operations. This feedback loop continues until the range locator 430 determines a trajectory that places the robot within reach of the target object, e.g., until a confirmation signal 440 is generated.

For example, the range locator 430 may determine whether or not the target object is occluded by comparing the RFID location of the target object with the location and depth of the extracted occluded regions. If there is an overlap between the RFID location and one or more of the occluded regions and the depth of the RFID location is greater than the depth of the one or more occluded regions, then the range locator 430 may determine that the target object is occluded by the one or more occluded regions. Example embodiments of these models and operations are discussed below.

Figure 5:
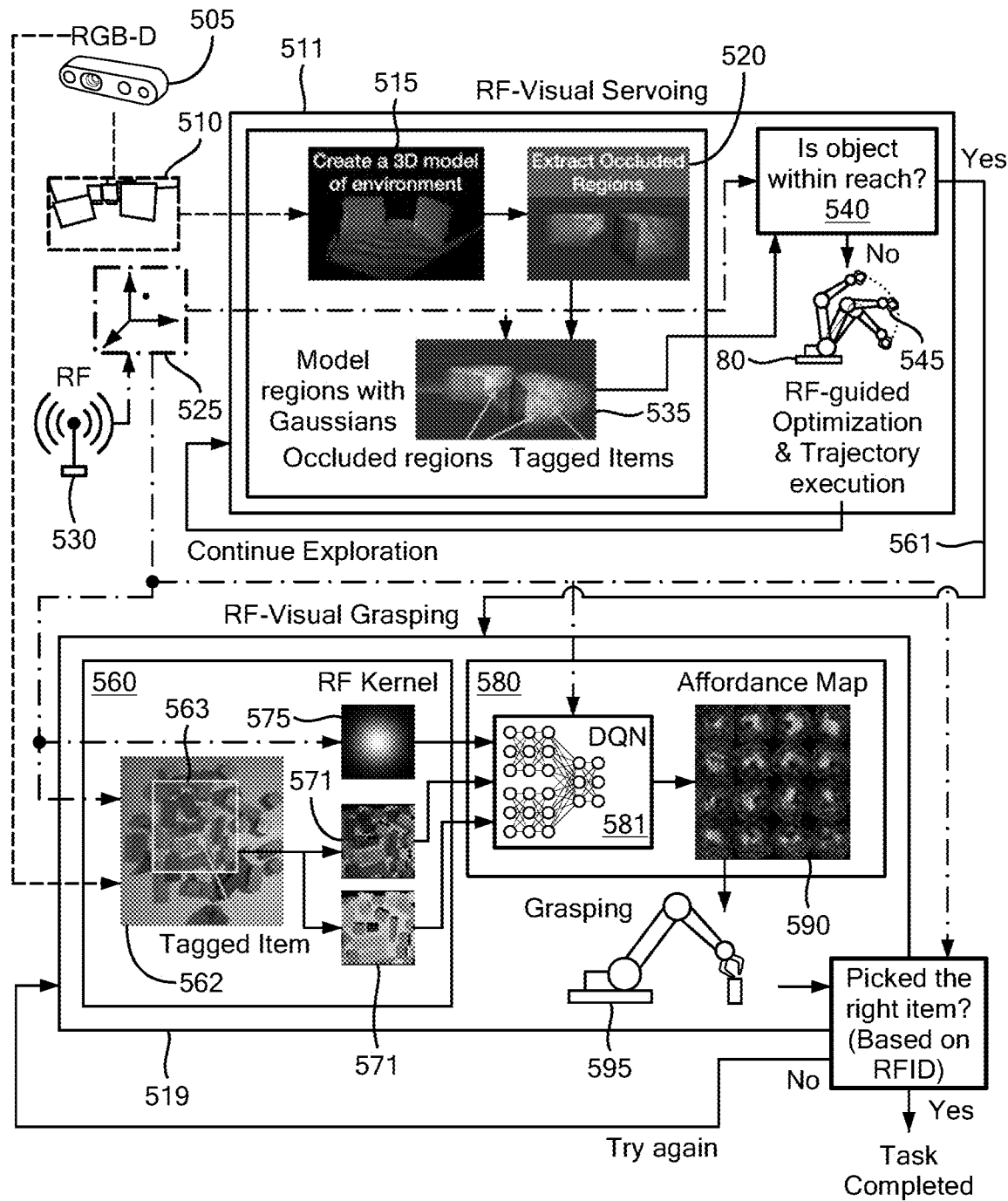
FIG. 5 is a block diagram of an example embodiment of a control system.
Figure 6:
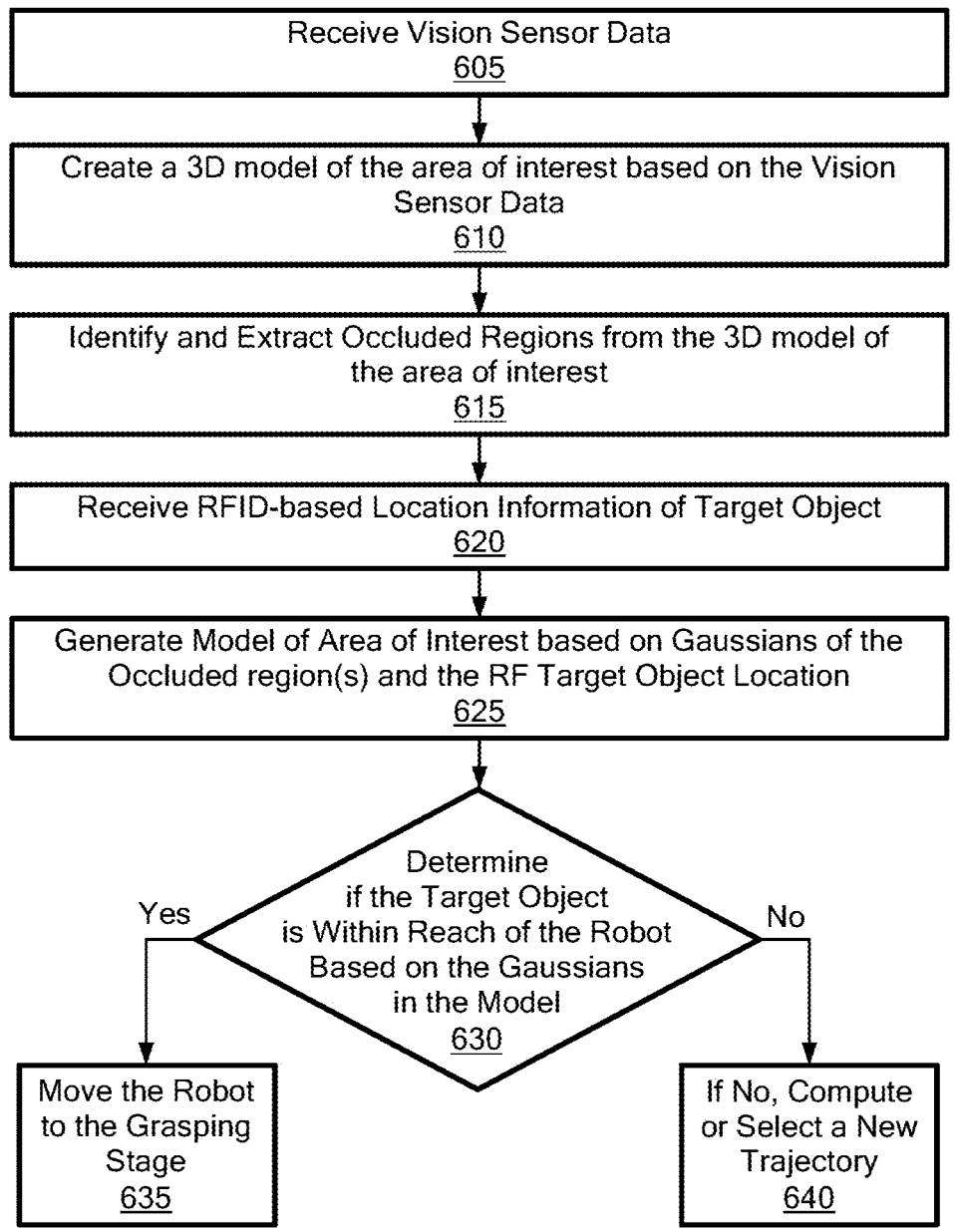
FIG. 6 is a flow diagram of an example RF-Visual Servoing method.

FIG. 5 is a diagram of an RF-Visual Servoing Stage 511, while FIGS. 6A and 6B are flow diagrams which include illustrative operations of one embodiment of a method which may be performed by Stage 511 for performing RF-guided optimization and trajectory execution. As previously described, the controller 30 (FIG. 1) may perform these operations based upon the instructions stored in storage area 40.

Referring to FIGS. 5, 6A and 6B, the method includes, at 605, receiving data 510 from a vision sensor 505. As indicated, the data may be RGB-D data output from a camera or other image sensor. The data may be a different type of data in another embodiment provided, for example, that the data provides a video representation of the area of interest and optionally depth information of features in the area of interest including any one or more of those that may be partially or fully occluding the target object.

At 610, a model (e.g. model 515 in FIG. 5) of the area of interest may be generated based on the vision sensor data. The model may be, for example, a three-dimensional model generated based on the RGB data and the depth data output from the camera. The model 515 may be represented as a video-based unstructured environment that includes one or more features that occlude the target object.

At 615, an extraction operation may be performed which includes identifying and then extracting occluded regions 520 in the model-based representation of the area of interest. The occluded regions may be extracted from the extractor 420 as described herein. The occluded regions may correspond to soft or hard obstructions that are within the field of vision of the camera focused on the area of interest. The occluded regions may be identified, for example, by projecting the occluding surface(s), e.g., obstruction(s), on to the camera frustrum. Once identified, the occluded regions may be extracted and used as a basis for generating one or more trajectories by the trajectory calculator.

At 620, RFID-based location information 525 of the target object is received from the RFID reader. The RFID reader receives or determines such location information based upon signals backscattered (or otherwise directed or reflected) by the tag and received by the antenna 530 (FIG. 5).

At 625, a model 535 of the area of interest is generated based on a Gaussians distribution model of the occluded regions output from the extractor and the RFID-based target object location. One or more trajectories (e.g., orientations, movements, positions, etc.) may be computed by the trajectory calculator 425 for the robot based on the Gaussians of the occluded regions. Example embodiments of how the Gaussians of the occluded regions may be generated along with the trajectory calculations are described in greater detail below.

At 630, a determination is made, at 540, as to whether the target object is within reach of the robot. Such a determination may be accomplished, for example, by comparing robot location information with the RFID-based location information and corresponding Gaussians. In one embodiment, for those tagged target objects within reach, the grasping Q-Network 581 may select the grasping strategy (or policy) with the highest probability of success for grasping the target object.

Figure 8:
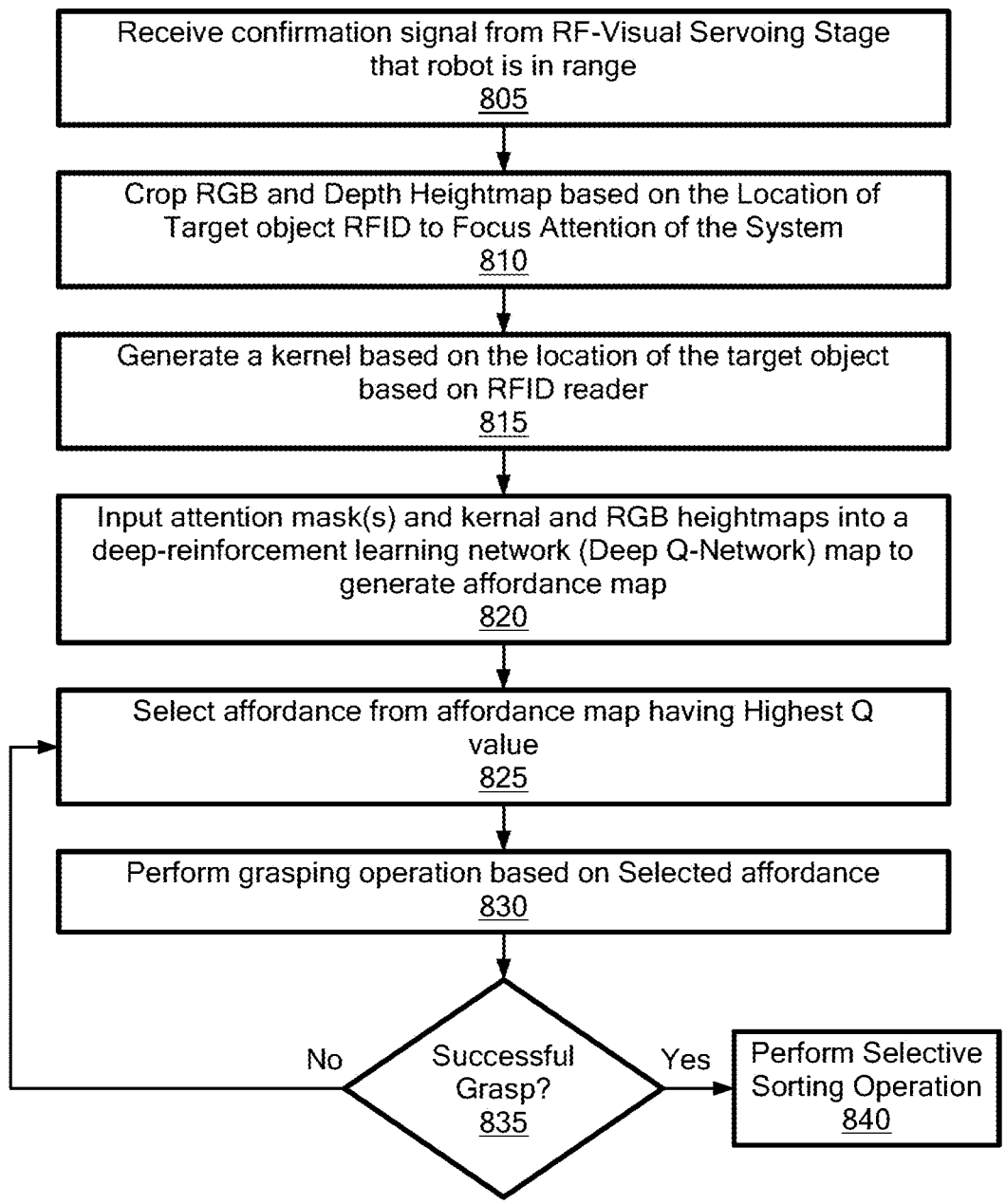
FIG. 8 is a flow diagram of an example RF-Visual Grasping method.

At 635, if operation 630 determines that the target object is within reach of the robot, the system transitions to an RF-visual grasping operation (e.g., RF-visual grasping 805 in FIG. 8).

At 640, if operation 630 determines that the target object is not within reach of any of the trajectories, then one or more new trajectories are computed until either an acceptable trajectory is calculated that places the robot within reach of the target object. Decluttering may be performed at various times, e.g., after operation 615 in FIG. 6A, at operation 830 in FIG. 8, or at another time prior to grasping the tagged target object). The decluttering operation may involve, for example, moving or removing one or more objects (e.g., clutter which may or may not correspond to an obstruction). In one embodiment, after the occluded regions 520 are identified and extracted in operation 615, the controller 30 may generate control signal(s) for moving the robot to grasp and then move or remove the clutter on the target object. For example, if the controller 30 determines that the target object is under clutter, the robot may move and grasp the clutter and place it in a predetermined location so that the target object is no longer or less occluded. In another case, the robot may just move the obstruction to one side of the target object to uncover it or declutter the region occupied by the target object. Once the declutter operation is completed, the grasping strategy may then be recalculated for purposes of accessing (e.g., grasping) the target object.

In one embodiment, trajectory calculator 425 may calculate the optimal trajectory of the robot by framing it as a Partially Observable Markov Decision Process (POMDP) to be solved by a trained model. In this process, the trajectory calculator may explore the area of interest as represented by the RGB-D data while reducing or minimizing the trajectory toward the location of the target object as determined by the RFID-based location. This may be accomplished as follows.

The state of the area of interest (S) may be expressed as the robot joint state ($X^R \in R^6$) and the RFID location may be expressed as $p=(x_p, y_p, z_p)$, also the occluded regions and/or other objects and features may be determined by coordinate location. The control signal, $u_t \in R^6$, may be applied to the joint state and may change the robot orientation. It should be appreciated that the number six (6) in these formulas is used because a UR5e robot has six degrees of freedom. If another type of robot is used with a different number of degrees of freedom, the number 6 in the formulas may be changed accordingly. For example, for a PR2 robot, the number 6 in the aforementioned formulas may be replaced with the number 7 because a PR2 robot has seven degrees of freedom (e.g. $X^R \in R^7$ and $u_t \in R^7$).

The observations ($\Omega$) may be expressed as the joint state, the RFID location of the target object, and the RGB-D data from the vison sensor (which may be any of the cameras described herein including, but not limited to, a wrist-mounted camera). In some cases, the problem may be considered to be partially observable because the robot (or more accurately the system controller 30) has no prior knowledge (nor observes) of the entire 3D area of interest in a workspace.

Taking the foregoing into consideration, uncertainties relating to the locations of occlusions in the area of interest may be modeled. In one embodiment, the trajectory calculator 425 may encode the uncertainties using a mixture of Gaussians. For example, each occluded region indicated by the extractor 420 may be encoded (or modeled) as a 3D Gaussian.

Figure 7:
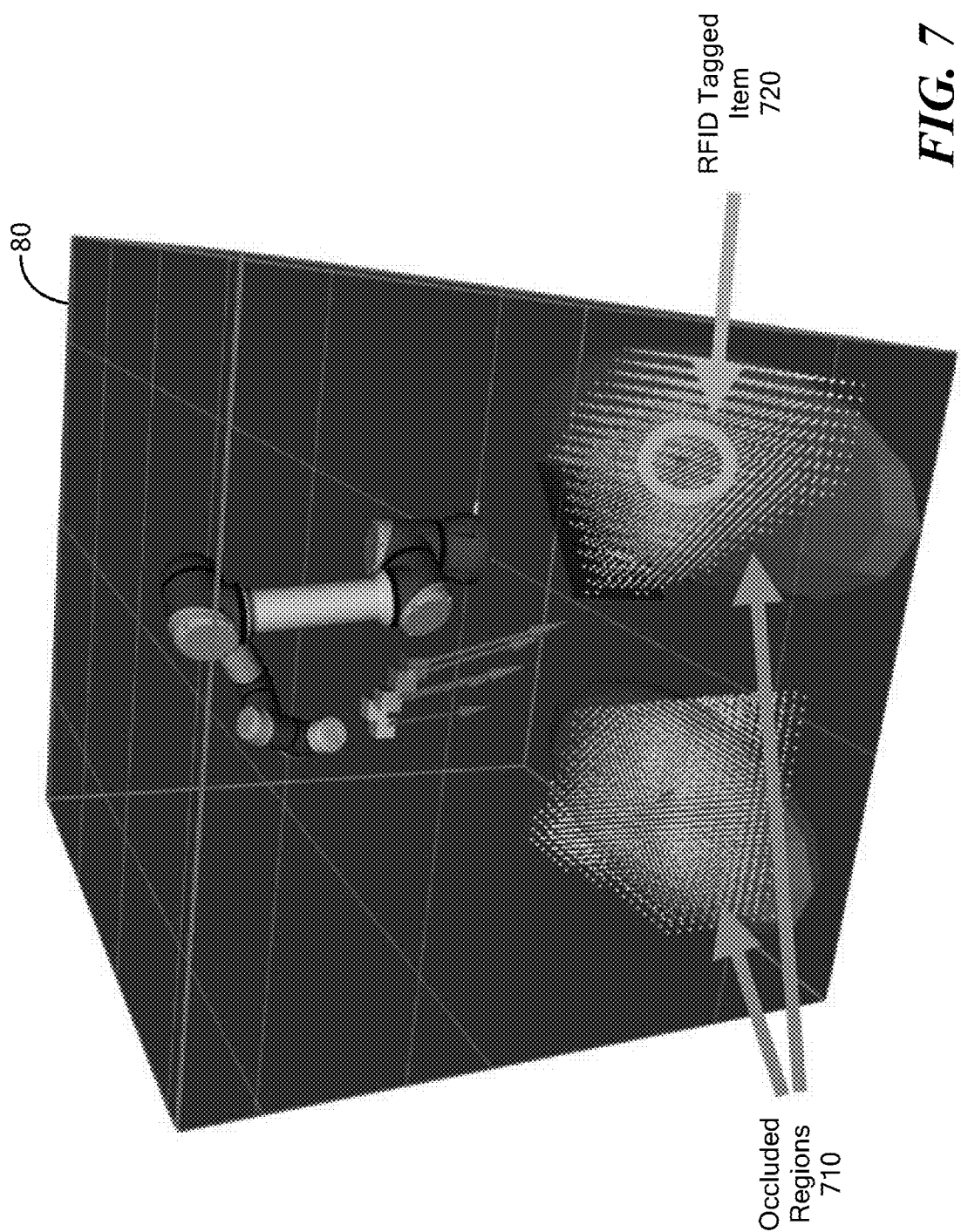
FIG. 7 is a perspective view of an example robot arm having at least an RF sensor and an image sensor disposed in a search region with an example area of interest having occluded regions.

FIG. 7 illustrates an example of encoded occluded regions 710 relative to the target object 720 equipped with an RFID tag. Also, the robot 80 is shown in this space. The mean and covariance of the m-th Gaussian may be denoted ($X_m$, $\Sigma_{m_0}$) at t=0. The environment (or area of interest) may be assumed to be static. Hence, each mean may remain the same over the trajectory planning horizon, but the covariances $\Sigma_{m_t}$ be updated as the system explores the area of interest.

In order to determine a trajectory which allows the robot to efficiently maneuver towards the target object, an RF-based objective function may be satisfied. In so doing, the trajectory calculator 425 may reduce (or ideally minimize) the trajectory (control effort), while reducing (or ideally minimizing) uncertainty of occluded regions and clutter, etc., in the surrounding area of interest. Mathematically, the cost at time t may be expressed as Equation 1.

$$C_{t=0:T}(x_t^R, \sum_t^{1:M}, u_t) = \alpha \|u_t\|_2^2 + \sum_{m=1}^{M} \beta_t^m tr(\sum_t^m) \quad (1)$$

where:
C is cost;
t is time;
T corresponds to the horizon of trajectory planning;
$X^R \in R^6$ is a vector representing robot joint values at time t, as previously discussed;
M is the total number of occluded regions;

u is the control signal robot joint control, $u_t \in R^6$ as previously discussed;
m is an index which corresponds to one occluded region within the total number of occluded regions (M);
tr is trace of a matrix, which is a mathematical function equal to the sum of diagonal element;
$\alpha$ is a scalar weighting parameter; and
$\beta_t^m$ is a scalar weighting parameter.

In one embodiment, $\alpha$ and $\beta$ may values within respective predetermined ranges selected based on a balance of considerations. For example, the value of $\alpha$ may be selected to be a larger value within its predetermined range if the easiest trajectory (e.g., less effort) is to be optimized. On the other hand, if more exploration within the area of interest and a longer trajectory is to be allowed, then the value of may be selected to be a smaller value within its predetermined range.

In implementing the objective function, the function may be designed to push the robot end effector (e.g., grasping hardware coupled to the end of the robot arm) away from collisions. This is because if the camera is too close to a large occlusion (e.g., greater than a predetermined size), the covariances $\sum_t^{1:M}$ may become larger, which, in turn, would penalizes the expected cost and biasing the optimal trajectory away from the large obstruction.

To bias the controller 30 to explore each occluded region surrounding the RFID location of the target object, each region may be set with a corresponding weight, $\beta_t^m$. In one embodiment, that weight may be significantly larger than weights assigned to other occluded regions in the area of interest. In one embodiment, a significantly larger weight may mean that the system will be penalized more if the corresponding $\Sigma_t^M$ becomes larger. In this case, in one embodiment the trajectory calculator may choose a trajectory to avoid getting penalized. This may result in an optimized trajectory for grasping the tagged target item. Moreover, to increase flexibility in the trajectory determination in the beginning, the determination may begin with a lower $\beta_T^1$ which is increased over time.

Given the above cost function, the trajectory optimization problem may now be expressed as a minimization function over planning horizon T based on Equation 2:

$$\min_{x_{0:T}^R, u_{0:T}} \mathbb{E}\left[\sum_{t=0}^{T} C_t(x_t^R, \sum_t^{1:M}, u_t)\right] \quad (2)$$

$$\text{s.t. } x_{t+1}^R = f(x_t^R, u_t, 0), x_t^R \in \mathbb{X}_{feasible}, x_0^R = x_{init}^R$$

$$u_t^R \in \mathbb{U}_{feasible}, u_T = 0$$

where:

$\mathbb{X}_{feasible}$ and $\mathbb{U}_{feasible}$ represent the set of feasible joint states and control signals of the robot arm, and $x_{init}^R$ is the initial joint state of the robot.

The dynamics model for the robot may be expressed by a differentiable and stochastic function based on Equation 3:

$$X_{t+1}^R = f(X_t^R, u_t, q_t), q(t) \sim N(0,I) \qquad (3)$$

in which:

t is time;

$X_t^R$ is a vector representing robot joint values at time t, as previously discussed;

$u_t$ is control signal for robot joint control over time;

q represents dynamics noise;

$q_t$ is the dynamics noise at time t;

N is a function to compute dynamics noise, e.g., N may be a function N(0,I) corresponding to any of a plurality of types of Normal distribution functions; and I represents an identity matrix, e.g., in one or more embodiments I is a square matrix having diagonal elements with a value of 1.

The method also includes propagating beliefs using Extended Kalman Filter (EKF). Belief propagation may correspond to a process for performing interference in graphical models. In one implementation, it may be used to make inference about each unobserved node (or region) based on any observed nodes (or regions). EKF may correspond to an algorithm that uses a series of measurements observed over time and produced estimates of unknown variables. Various types of EKF algorithms may be applied in this case. By making inference about unobserved situations, the best trajectory may be determined to reduce its costs.

In accordance with one embodiment, RF-based Initial Trajectory may be performed. To aid the optimization solver (trajectory calculator) 425 and enable faster convergence, the optimization function may be seeded with a straight-line initial trajectory in Cartesian space from the end-effector to the RFID location. The trajectory calculator may iteratively test different trajectories (e.g., different angles, orientations, and/or positions of the robot arm) to the target object until a determination is made that no major obstacles remain for a given trajectory. Then, control may proceed to grasping stage/phase 519/560. In some cases, the target may still be occluded by distractor objects (e.g., under a pile). In this case, a declutter operation may be performed before grasping the target object.

The iterative process may be stopped based on formulating an exploration termination criteria as a function of the uncertainty region around the target object. In one embodiment, such uncertainty may be encoded both in the covariance of the 3D Gaussian around the object $\Sigma^1$ and in visibility of the voxels v in the vicinity of v the target object's location p. Mathematically, the termination criteria can be expressed based on Equation 4.

$$\text{trace}(\Sigma^1) < \rho_\Sigma \text{ or } \sum_{v \in v(p)} F(v)/|v(p)| > \rho_v \qquad (4)$$

where:

υ represents a voxel;

F(υ)= is a function which takes on a value of 1 if voxel υ has been seen by the camera and is otherwise 0;

p is the target object's location;

v(p) represent the vicinity of the location p;

|v(p)| represents the total number of voxels in the vicinity of location p; and $P_v$ is a threshold for visibility.

The criteria imply the uncertainty around the object is less than threshold $\rho_\Sigma$, or the visible fraction of the region around the RFID is greater than threshold $\rho_v$. In accordance with one example implementation, $\rho_\Sigma$=0.005 and $P_v$=0.1, and the vicinity, v(p), may be set to a 5 cm~5 cm~10 cm cube centered at RFID location. However, these values are just examples and different values may be used in other embodiments.

The combination of the above criteria may be used to manage the diversity of clutter scenarios. For example, when the target item is under a soft cover, the trace of covariance may not be below $\rho_\Sigma$ since the cover may occlude a large region. However, enough voxels in the vicinity of the item will be visible to the vision sensor such that the second criterion is met, in which case the grasping stage may be started.

The robot attempts to grasp and pick up the target object, and stops once the RF perception module determines that the RFID's location has moved with the end-effector. By performing trajectory optimization in this manner, the RF-Visual Servoing stage 511 may intelligently explore the area of interest and move (or servo) the robotic arm around obstacles (or remove those obstacles) to get close to the target object, for example, in order to perform a grasping operation for the target object.

Robot Grasp Control Stage

FIG. 5 is a diagram showing one example embodiment of a RF-Visual Grasping Stage 519 which may be used to control the robot to grasp the target object after the trajectory has been determined and the robot has been moved into position and orientation for grasping. The RF-Visual Grasping Stage 519 may comprise a processor section 560 and a deep-reinforcement learning network 581. Processor section 560 may sometimes be referred to as a pre-processor section since it processes information which is further processed by deep-reinforcement learning network 581. In operation, a controller (such as controller 30 in FIG. 1, for example) may execute instructions of the algorithms or models (e.g. instructions 43) to perform the functions of the pre-processor section and learning network as described herein.

The pre-processor section 560 may include three inputs. The first input may be a control signal 561 from the RF-Visual Servoing Stage 511. In embodiments, control signal 561 has a first value or characteristic indicating that the robot is within range to grasp and a second, different value or characteristic indicating that the robot is not within range to grasp. In one embodiment, the control signal output from the RF-Visual Servoing Stage may serve to trigger operation of the RF-Grasping Stage 519. The second and third inputs may include the same inputs of the RF-Visual Servoing stage 511, namely the location information determined based upon the RF-signal received from the tag (e.g., the RFID tag) and the visual data (e.g., image data such as RGB-D data) output from the vision sensor. These inputs may be used as a basis for controlling a grasping operation of the robot.

FIG. 8 is a flow diagram showing operations included in an embodiment of a method for performing grasping control of the robot. This method may be performed, for example, by the RF-Visual Grasping Stage 519 after the trajectory has been determined by the RF-Visual Servoing Stage 511 (FIG. 5). The method may be performed by a different stage in another embodiment.

Referring to FIGS. 5 and 8, the method includes, at 805, receiving a confirmation signal from RF-Visual Servoing Stage that robot is in range for grasping. The confirmation signal may serve as a trigger to activate operation of the RF-Visual Grasping Stage.

At 810, at least one RF-based attention mask is generated and applied on data output from the vision sensor. In embodiments, the mask may be generated based upon information/data from RF signals (e.g. based upon RF measurements), and applied on visual information (e.g. RGB-D information).

In one embodiment, multiple attention masks may be generated based on the RF measurements and applied on the output 562 from the vison sensor. This may be accomplished, for example, using two main strategies (and at three layers). First, an RF-based binary mask may be generated by cropping RGB and depth heightmaps to an area around the location of the target object. The area 563 around the location of the target operation may be designated, for example, by a square of a size less than the image generated by the vision sensor. In the example shown, the square may have a size of 11 cm×11 cm, but may have a different size in another embodiment. The area may have another shape or a random shape in another embodiment. The size of the area may be predetermined or may be determined based on the features (e.g., obstructions, barriers, occlusions, etc.) detected in the image.

The cropped heightmaps may be computed, for example, by extracting a 3D point cloud from one or more RGB-D images and projecting the image(s) orthographically, e.g., parallel to a table top. The cropping operation may be performed, for example, to eliminate areas of the image that are not proximate to the vicinity of the tag including the target object and thus to better focus the process ultimately on determining an optimal trajectory.

There is one attention mask that is applied on 4 heightmaps. The heightmaps may differ from one another in terms of color and depth, e.g., the 4 heightmaps may include a red heightmap, a blue heightmap, a green heightmap, and a depth heightmap. The number of attention masks shown are just examples and may be a different number in another embodiment.

At 815, an RF kernel 575 may be generated based on the location of the target object, as determined by the RFID. So, in one embodiment the RF kernel may effectively be a "location map" generated from one or more RF tag signals. The RF kernel may include, for example, a two-dimensional Gaussian centered around a point p, having a standard deviation which accounts for RF localization errors.

Generating the attention mask(s) 571 and 572 and the kernel 575 may allow the network 580 to focus on the vicinity of the target object and compute an affordance map (as described below) with greater resolution and/or less computational complexity.

At 820, the attention mask(s) and RF kernel may be input into a deep-reinforcement leaning network 581 to generate an affordance map 590. The deep-reinforcement learning network 581 may effectively fuse the image and RF data for purposes of determining the affordance map, and thus candidate trajectories. The fusing may involve, for example, fusing the height data from the attention mask (originated by the image sensor) and the location data from the RF kernel (originated by the RF sensor). In other embodiments, different types of data (in addition to or in place of the heightmap data and RFID data) may also be fused to accomplish the goal of identifying occluded objects. For example, fusion of millimeter-wave or acoustic wave data with vision data may be performed.

In one embodiment, the deep-reinforcement learning network may be a model-free Deep Q-Network (DQN) that determines up to a predetermined number of grasping affordances from the RGB-D data, using the RFID location of the target object as an attention mechanism. In one embodiment, the Deep Q-Network may include a feed-forward, fully convolutional network (FCN). The network may receive state representations of the color image and depth data (e.g. RGB-D data) and RFID position as input and may output pixel-wise map of Q values. The controller 30 may then select one of the affordances in the map as an optimal grasping policy. In one embodiment, the affordance map may be considered to include a plurality of affordances that define policies for controlling candidate trajectories. The selected affordance may be, for example, as the one with the highest Q in the map 590. The type of affordance map to be generated may be based on the specific configuration of the Deep-Q network (DQN).

Figure 9:
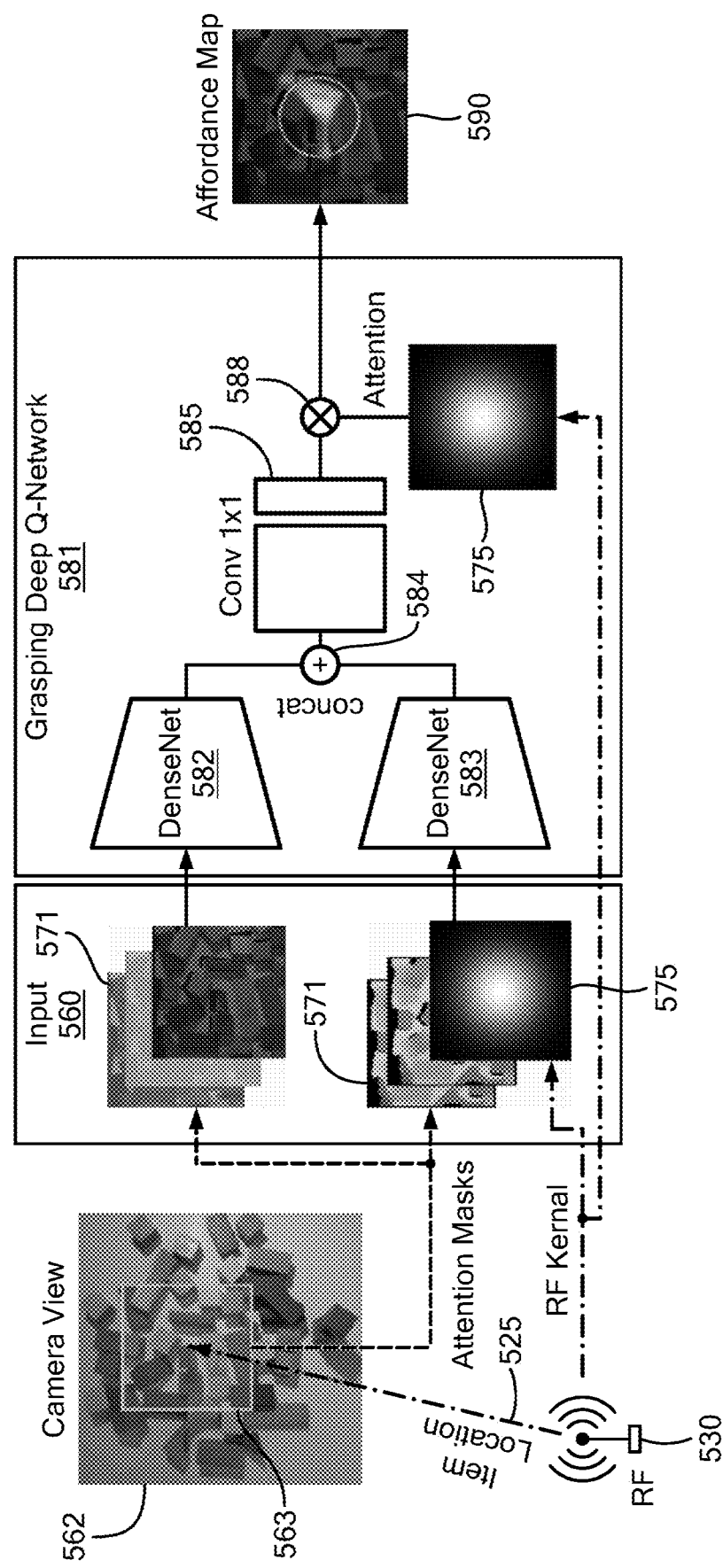
FIG. 9 is a block diagram of an example deep-learning network for controlling grasping of an object.

FIG. 9 is a diagram illustrating an example embodiment of a Deep-Q Network which may be the same as or similar to the Deep-Q Network of FIG. 5. In this example embodiment, respective ones of image sensor inputs 571 (in the form of attention masks) are provided to a Deep-Q Network 581 as is an RF kernel. In this example embodiment, Deep-Q Network 581 comprises one or more a convolutional neural networks (CNNs) illustrated in FIG. 9 as first and second densely connected convolution networks (or DenseNets) 582, 583. Thus in this example embodiment, image sensor inputs 571 (in the form of attention masks) are provided to each of DenseNets 582, 583 while an RF kernel 575 is provided to DenseNets 583.

In the example embodiment of FIG. 9, each of the DenseNets 582, 583 may have a plurality of layers. In the example shown in FIG. 9, each of the first and second DenseNets include 121 layers but may include a different number of layers in another embodiment. Also, in embodiments, the first and second DenseNets may have different numbers of layers. In each of the DenseNets 582 and 583, each layer may obtain inputs from all preceding layers and pass on its own feature maps to all subsequent layers. Thus, each layer receives collective knowledge from the preceding layers, with the initial layer receiving as inputs the output of input section 560. The operation of network 581 is described in detail below in conjunction with FIG. 10.

Figure 10:
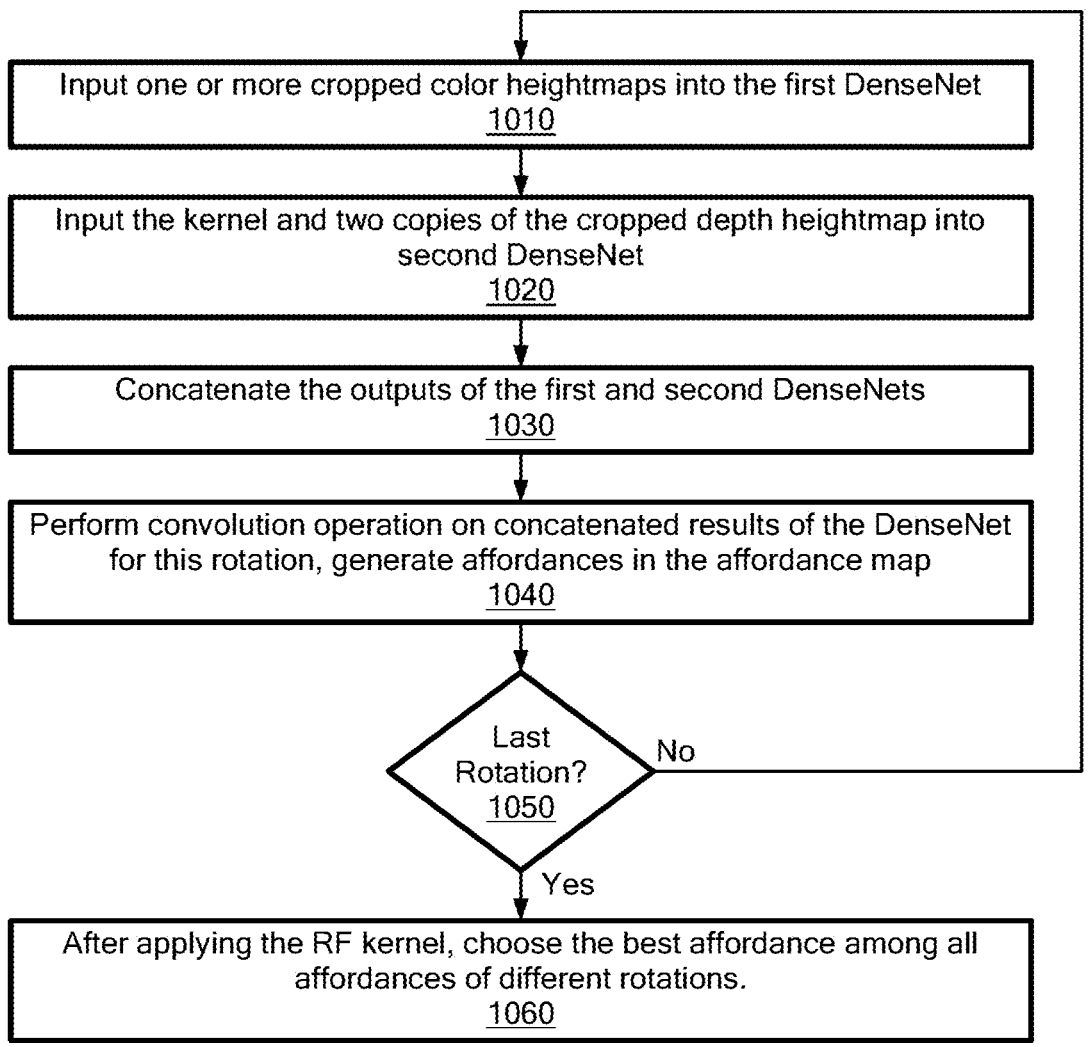
FIG. 10 is flow diagram of an example deep-learning control method.

FIG. 10 is a flow diagram showing operations which may be used to generate the affordance map 590 of operation 820. Referring to FIG. 10, at 1010, the first DenseNet receives as input one or more color heightmaps. In one embodiment, the first DenseNet may receive three channels of cropped RGB heightmaps but may receive a different number of heightmaps in another embodiment.

At 1020, the second DenseNet (e.g. DenseNet 583 in FIG. 9) receives as input the RF kernel plus one or more copies of the cropped depth heightmap. In one embodiment, the second DenseNet may receive the RF kernel plus multiple copies of the cropped depth heightmap. The multiple copies may be two but may be a different number in another embodiment. In one embodiment, it is possible to configured the system so that all color and depth heightmaps and the RF kernels are fed into one Deep Neural Network.

To determine optimal grasping affordances for the affordance map, the inputs into the first and second DenseNets may be rotated a predetermined number of times, e.g., the inputs may be rotated in 16 directions and fed separately to respective ones of the network DenseNets. The number of rotations may correspond to the number of affordance in the affordance map and thus the number of possible grasping policies that may be used as a basis to execute the grasping operation of the occluded target object.

At 1030, the outputs of the first and second DenseNets are concatenated.

At 1040, a convolution operation is performed for each concatenated result of the DenseNet. More specifically, the convolution operation is performed for the concatenated result for each rotation angle of the predetermined number of rotation angles. In one embodiment, the convolution operation may be performed using two convolution layers 585 with kernel size of 1×1 thereafter. The output of the convolutional layers may then be combined with the RF kernel 575 by a combiner 588 to produce a two-dimensional (2D) affordance for each rotational angle of the map 590. The affordance produced for each of the sixteen angles are then combined to produce an affordance map that shows Q function estimates (e.g., candidates) of the position and rotation of the robot arm to be used to perform the grasping operation.

At 1050, a determination is made as to whether the rotation is the last rotation of the predetermined number of rotations. If no, a rotation is performed and the method returns to operation 1010 until the last rotation is executed. If yes, the method continues to the next operation.

At this point, it is noted that, for each rotation, the outputs of the first and second DenseNets are concatenated 584 along channels. For example, the outputs of the first and second DenseNets are concatenated at an initial one of the sixteen angles and then the result is output for convolution, the outputs of the first and second DenseNets are concatenated at a second one of the sixteen angles and then the result is output for convolution, and so on.

At 1060, after applying the RF kernel, the best affordance may be chosen from among all affordances of different rotations. The best affordance may, for example, be the most optimal in terms of direct pathway, efficiency, grasping ability, Q value, and/or exploration of the target object in the area of interest.

Returning to FIG. 8, at 825, the controller 30 selects one of the affordances in the affordance map. The selected affordance may be the one in the map having the highest Q value. The highest Q value may be the one considered to have the highest probability to successfully grasp the target object.

At 830, the grasping operation 595 may be performed based on the position and rotation angle of the robot that corresponds to the selected affordance.

At 835, a determination is made as to whether or not the robot picked up the target object. If yes, then the grasping operation is deemed to have been successfully performed and the robot may deposit the target object at a designated location. If the robot picked up the wrong object, the object may be returned (e.g., dropped) back in the area of interest and control may return to operation 825, where another affordance from the map is recalculated and selected. The grasping operation may then be re-executed based on the position and rotation angle of the newly selected affordance. The method may continue until a successful grasp operation is determined to have occurred or the last affordance in the map is executed. Thus, in the case where the initial grasp failed to grasp the target object, grasping the target object may be performed on an iterative basis. When a declutter operation is performed, operation 835 may be implement in a different manner in some embodiments. For example, the declutter operation may significantly change the area of interest that includes the target object. The RF-Visual Grasping Control Stage may be re-executed from the beginning with at least new RGB-D data. If the declutter operation moved the target object, re-execution of the RF-Visual Grasping Control Stage may also be performed based on the new RFID location of the target object after declutter.

Training

The Deep Q-Network may be trained prior to use, for example, by a Huber loss function. The training may increase the accuracy of the network by reducing sensitivity to outliers.

The initial weights of the DenseNets may be taken from a pre-trained model and fine-tuned for training by a plurality (e.g., 500) iterations during simulation. The gradient may only be backpropagated through one or more pixels of the affordance map executed to perform grasping according to its predicted value.

In one embodiment, the network may be trained by stochastic gradient descent with the following example parameters: learning rates $10^{-4}$, momentum 0.9, and weight decay $2^{-5}$. The reward discount factor is 0.2. In training, prioritized experience replay may be used to improve sample efficiency and stability. In one example implementation, a threshold may be defined as follows: $\rho i=0.05+\min(0.05\times\#iteration, 4)$. Stochastic rank-based prioritization may then be performed among experiences with rewards$\geq \rho i$. Prioritization may be estimated by a power-law distribution.

In addition to or in lieu of the above-described training operations, in one embodiment the deep-learning network may be trained for purposes of performing the grasping control operation. One example of such a deep-learning network is a deep convolutional neural network which, for example, may be formulated as a Markov Decision Process (MDP). In one embodiment, the action of grasping may be performed with a parallel jaw gripper of the robot at position $g_t=(X_{a_t}, Y_{a_t}, Z_{a_t})$ with gripper rotation of $\theta_{a_t}$. The goal is to learn the optimal policy (e.g., affordance) $\pi^*$ to grasp the target object either directly and/or by manipulating the area of interest. This policy (or affordance) can be cast as a deep-reinforcement learning problem, which may be solved by DQN network 81 using an off-policy Q-learning approach.

The RF-Visual Grasping Control Stage 519 may solve the deep-reinforcement learning problem by maximizing a future reward function. For example, an action-value function $Q(S_t, a_t)$ may be provided which estimates the expected reward at the state $S_t$ when taking action according to policy $\pi(S_t)$. In one embodiment, Q-learning can be defined by Equation 5.

$$Q(s_t, a_t) \leftarrow Q(s_t, a_t) + \alpha \left[ r_t + \gamma \max_a Q(s_{t+1}, a) - Q(s_t, a_t) \right] \quad (5)$$

where:
$r_t$ is the reward that system receives after action $a_t$,
$\alpha$ is the learning rate,
$\gamma$ is the discount factor,
t is time, and
$Q(s_t, a_t)$ is a function indicating quality of action $a_t$ for state $S_t$.

The aim of the network is to learn the Q-function by minimizing Equation 6.

$$\delta_t = \left[ r_t + \gamma \max_a Q(s_{t+1}, a) - Q(s_t, a_t) \right] \quad (6)$$

RF-based Attention Mask and Rewards. In operation, the controller 30 may train the DQN in simulation and fold in RF information via reward and attention mechanisms. A spatio-temporal reward function may then be constructed to encourage the robot to grasp the target object or one or more objects nearby. In one implementation, the reward function $r(S_t, S_{t+1}, a_t)$ may have (1) a value of 1 when the robot grasps the target object, (2) a value given by Equation 7 if it grasps another object, or (3) a value of 0 otherwise.

$$\text{MIN}\left(\frac{\varrho}{\|p_t - g_t\|}, 1\right) \quad (7)$$

The parameter $\varrho$ may be a constant set to a predetermined value, e.g., 0.007. The value for $\varrho$ may be selected, for example, to normalize the reward to 1 in simulation. In one embodiment, this value may be empirically chosen.

Since RF perception stage tracks the RFID's location, it can determine whenever the grasp is successful (it is picked up).

In one embodiment, the rewards function may be implemented by allocating a higher reward when, during a training phase, the robot is able to grasp the target object on the first try. On second or subsequent tries, rewards may still be allocated but those rewards may be successively lower for successful grasp outcomes.

A number of additional operations may be performed after controller 30 determines that a successful grasp of the target object has been executed. One additional operation may include a selective sorting operation 840. After confirming that the target object has been successfully grasped by the robot, the controller 30 determines the location of a sorting bin into which the target object is to be placed. The controller may then control the robot to move and place the target object into the sorting bin. When there are multiple bins, the controller 30 may determine which of the particular bins into which the robot is to place the target object.

Example Implementation

One example implementation of the system may include a UR5e robot arm, 2F-85 Robotiq gripper, and an Intel Real-Sense D415 depth camera mounted on the gripper. The RF perception module is implemented as an RFID localization system on USRP software radios. The RFID localization system may be set up on a table in front of the robot arm 16 cm, at a position below the robot base level. The robot may be connected through Ethernet to a PC that runs Ubuntu 16.04 and may have an Intel Core i9-9900K processor; RTX 2080 Ti, 11 GB graphic card; and 32 GB RAM. A USB to RS485 interface to control the gripper from the PC.

The robot may be controlled using Universal Robots ROS Driver on ROS kinetic. Moveit! software and OMPL for planning scene and inverse kinematic solver may also be used. TSDF volume may be created using Yak, and PCL may be used to extract clusters and occlusion from TSDF volume. To solve the SQP for trajectory optimization, FORCES may be used. Code for the instructions executed by the controller may be implemented, for example, in both C++ and Python, and objects of interest may be tagged with UHF RFIDs (e.g., Alien tag) having dimensions that range, for example, from 1-12 cm.

In accordance with one or more of the aforementioned embodiments, a control system and method are provided which locates a partially or fully occluded target object (generally, occluded objects) in an area of interest. A variety of types of obstructions may occlude perception of the target object by a vision sensor. By combining visual information from such a sensor with RF-based location information, the control system may effectively "see through" the obstructions to pinpoint the location of the target object. Model-based and deep-learning techniques may then be employed to move the robot into range relative to the target object and to provide access by the robot to the target object, which access may include, but is not limited to, performing a grasping operation for the target object while, for example, the object is still in the occluded state.

In some embodiments, multiple target objects may be located in the area of interest, which, for example, may or may not be cluttered or unstructured with no a priori knowledge by the control system of the area layout or contents. Thus, the control system may be designed to operate in any context where locating an occluded object is to be performed. In some embodiments, the control system may locate and/or retrieve target objects in multiple piles.

Such a control system and method may be suitable for use in a variety of applications, including but not limited to those where prioritized sorting is to be performed. In some embodiments, the control system and method may locate and optionally retrieve all objects in the area of interest that belong to a specific type of class (e.g., all plastic bottles from a box) in one or multiple piles.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors logic, readers, calculators, modelers, extractors, locators, generators, and other information generating and information processing features of the embodiments described herein may be implemented in non-transitory logic which, for example, may include hardware, software, or both. When implemented at least partially in hardware, the controllers, processors logic, readers, calculators, modelers, extractors, locators, generators, and other information generating and information processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors logic, readers, calculators, modelers, extractors, locators, generators, and other information generating and information processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments described herein.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses are also apparent to those skilled in the art. The embodiments may be combined to form additional embodiments.

We claim:

1. A control system, comprising:
   a vision sensor configured to generate visual information;
   an antenna;
   a storage having instructions stored therein; and
   a controller coupled to the vision sensor, the antenna and the storage, the controller configured to execute the instructions stored in the storage to:
   a) determine a location of a tagged target object in an area of interest based on a radio frequency (RF) signal received by the antenna, wherein the tagged target object is at least partially occluded relative to the vision sensor;
   b) determine an optimized trajectory for movement of a robot arm to the tagged target object based upon a combination of the RF signal and the visual information, wherein:
      (i) the optimized trajectory is determined to reduce a trajectory length;
      (ii) the optimized trajectory is determined using the determined location of the tagged target object as an end-point; and
      (iii) the optimized trajectory is determined using the visual information to avoid obstacles; and
   c) in response to the determined optimized trajectory, generate a control signal using the optimized trajectory to perform a robot arm operation.

2. The control system of claim 1, wherein the RF signal is a radio frequency identification (RFID) signal received from the tagged target object.

3. The control system of claim 1 wherein:
   determining the optimized trajectory of the robot arm to the tagged target object comprises determining a trajectory of the robot arm to grasp the tagged target object; and
   generating a control signal to perform a robot arm operation comprises generating a control signal to perform a robot arm grasping operation.

4. The control system of claim 3, wherein the controller is further configured to execute the instructions stored in the storage to (d) determine whether the tagged target object has been grasped by the robot arm grasping operation.

5. The control system of claim 4, wherein the controller is configured to execute the instructions stored in the storage to perform a declutter operation before the robot grasping operation.

6. The control system of claim 5, wherein the declutter operation includes:
   generating a control signal to move an obstruction away from the tagged target object.

7. The control system of claim 1, wherein the visual information includes at least one of color video information or depth information derived from at least one vision sensor.

8. The control system of claim 1, wherein the tagged target object is a fully occluded object relative to the vision sensor that generates the visual information.

9. The control system of claim 1, wherein c) includes:
   controlling the robot arm to maneuver around one or more obstacles before performing the robot operation.

10. The control system of claim 1, wherein the robot operation is performed while the tagged target object is in an occluded state.

11. The control system of claim 1, further comprising:
    an RF localization system on the robot arm.

12. The control system of claim 1, further comprising:
    an RF localization system at a location different from a robot location.

13. The controller system of claim 4, wherein, when in d) the tagged target object is determined not to have been grasped by the robot arm, the controller is configured execute the instructions stored in the storage to repeat the robot arm grasping operation until the tagged target object is grasped by the robot arm.

14. A control system, comprising:
    a modeler configured to generate a representation of an area of interest (AOI) based on vision sensor data from a vision sensor, the area of interest including a target object including or proximate to a radio frequency identification (RFID) tag;

an extractor configured to extract one or more occluded regions from the AOI representation, the one or more occluded regions including an obstruction that is occluding the target object from the vision sensor; and a trajectory calculator configured to generate a first trajectory of a robot to perform a grasping operation of the target object, the first trajectory generated based on location information and the vision sensor data, the location information corresponding to a location in the area of interest based on a signal received by an antenna from the RFID tag.

15. The control system of claim 14, wherein the trajectory calculator is configured to:
generate the one or more occluded regions as Gaussians, and
generate the first trajectory to the target object based on the Gaussians.

16. The control system of claim 15, wherein the trajectory calculator is configured to generate the first trajectory by solving an optimization function, the optimization function to be initialized using a straight line trajectory in a reference space from an end-effector of the robot to the location of the targe object.

17. The control system of claim 14, wherein the trajectory calculator is configured to:
generate additional trajectories when the first trajectory is determined to have a probability of failure that lies in a first predetermined range, and
stop generating additional trajectories when one of the additional trajectories is determined to have a probability of success that lies in a second predetermined range.

18. The control system of claim 17, wherein the probability of failure is indicative of at least one obstruction that would impede the grasping operation along the first trajectory.

19. The control system of claim 17, wherein the probability of success is indicative of an absence of at least one obstruction that would impede the grasping operation.

20. The control system of claim 14, further comprising:
a range locator configured to determine whether the target object is within a grasping range of the robot based on the first trajectory and the location information.

21. The control system of claim 20, wherein the trajectory calculator is configured to generate at least a second trajectory based on a signal output from the range locator indicating that the target object is not within the grasping range.

22. The control system of claim 14, wherein the vision sensor data includes at least one of visual information or depth information of the area of interest.

23. The control system of claim 14, wherein the first trajectory corresponds to movement of the robot to perform the grasping operation while the target object is in an occluded state.

* * * * *